United States Patent [19]
Burgarella et al.

[11] 3,774,516
[45] Nov. 27, 1973

[54] PHOTOGRAPHIC CONTROL SYSTEM AND APPARATUS HAVING SELF-MONITORING FEATURES

[75] Inventors: John P. Burgarella, Sudbury; Peter P. Carcia, Reading; Richard C. Kee, Chestnut Hill, all of Mass.

[73] Assignee: Polaroid Corporation, Cambridge, Mass.

[22] Filed: Dec. 29, 1971

[21] Appl. No.: 213,303

[52] U.S. Cl. .................................. 95/42, 95/53 EB
[51] Int. Cl. .......................................... G03b 19/12
[58] Field of Search ........................... 95/42, 53 EB

[56] References Cited
UNITED STATES PATENTS
3,296,949  1/1967  Bounds ........................... 95/12.5 X
3,487,759  1/1970  Fahlenberg ........................... 95/42
3,245,332  4/1966  Kagan ............................. 95/53 EB Primary Examiner—Samuel S. Matthews
Assistant Examiner—Michael D. Harris
Attorney—Gerald L. Smith et al.

[57] ABSTRACT

Photographic system and apparatus in the form of a highly automated reflex camera is described. The camera incorporates a multi-gate control circuit operating the components thereof through the operational phases in the course of a single photographic cycle. In the course of each such cycle, phase changes are monitored by transducers acting as an electrical-mechanical interface within the system. The camera also features an automatic circuit reset operation in the event of a cycle malfunction.

53 Claims, 19 Drawing Figures

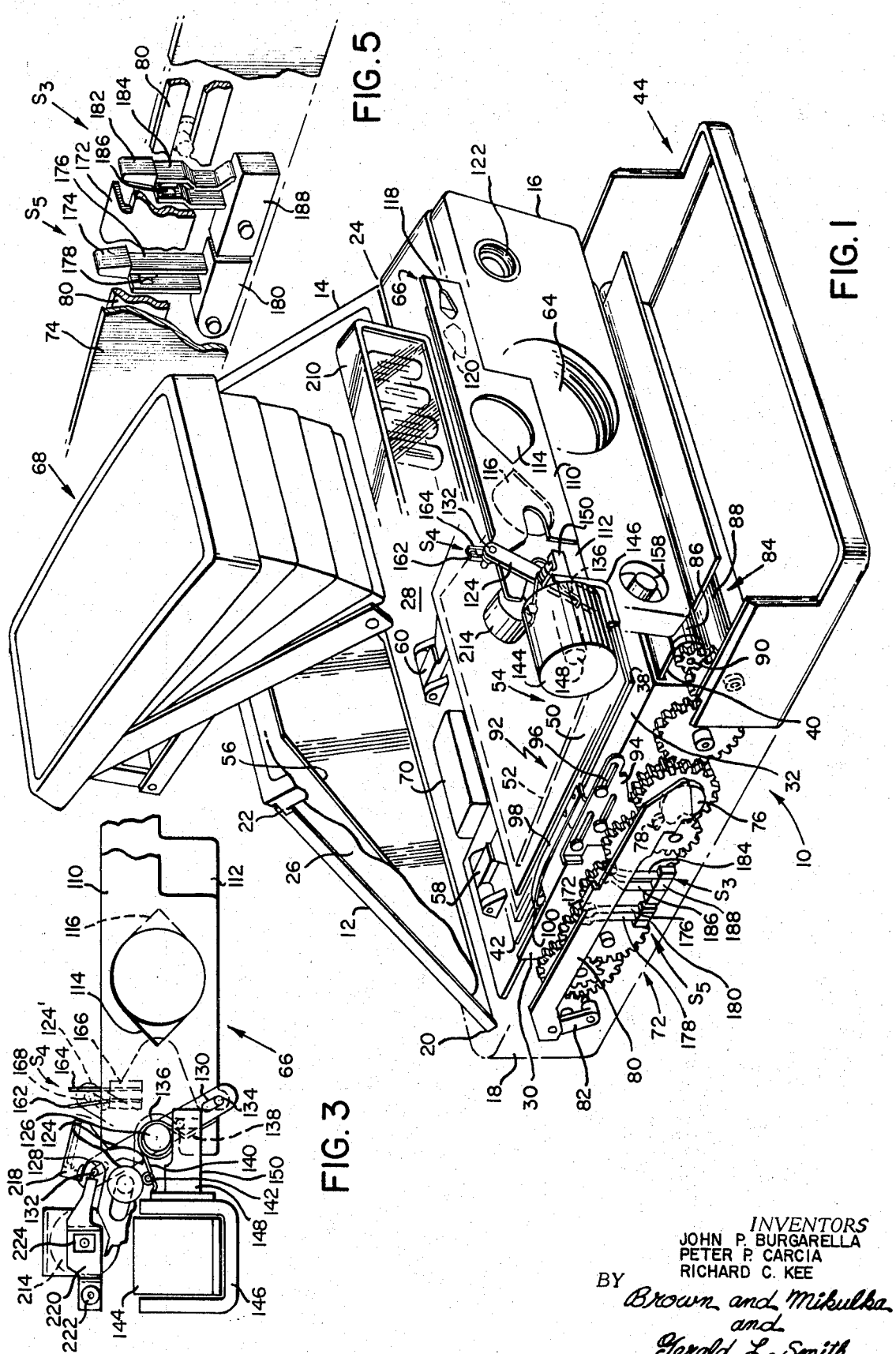

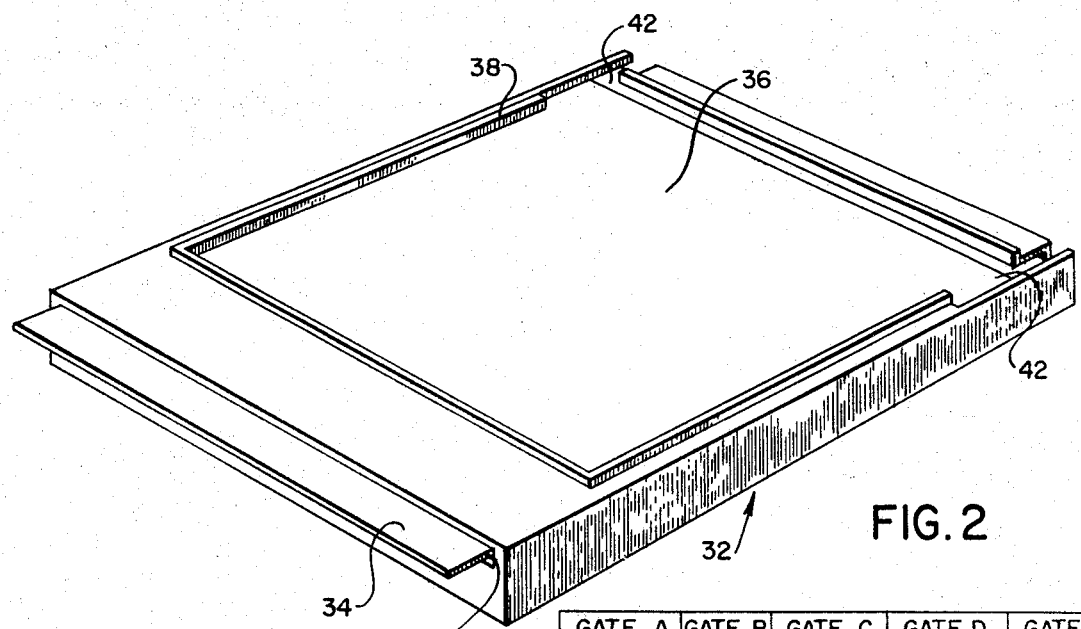

FIG. 2

| | | GATE A | GATE B | GATE C | GATE D | GATE E |
|---|---|---|---|---|---|---|
| | | SOLENOID 144 POWER DRIVE | SOL.144 POWER DOWN | MOTOR CONTROL | SOLENOID 214 POWER DRIVE | SOL. 214 POWER DOWN |
| AMBIENT OPERATION EVENT SEQUENCE | | a b c t$_1$ | a c t$_2$ | a b d t$_3$ | a e f t$_4$ | a e g t$_5$ |
| 1 | S$_1$ CLOSED AND SOLENOID 144 ENERGIZED | 0 0 0 1 | 0 0 0 | 0 0 0 1 | 0 0 0 0 | 0 0 0 1 |
| 2 | EXP. MECH. BLADES CLOSED MOTOR ENERGIZED S$_4$ CLOSED | 0 1 0 0 | 0 0 0 | 0 1 0 0 | 0 0 0 0 | 0 0 0 1 |
| 3 | S$_5$ OPENS, MOTOR STOPS | 0 1 0 0 | 0 0 0 | 0 1 1 1 | 0 0 0 0 | 0 0 0 1 |
| 4 | S$_3$ OPENS, DELAY 190 COMMENCES | 0 1 1 0 | 0 1 1 | 0 1 1 1 | 0 0 1 0 | 0 0 0 1 |
| 5 | COMMENCE EXPOSURE | 0 0 1 0 | 0 1 1 | 0 0 1 1 | 0 0 1 0 | 0 0 0 1 |
| 6 | TRIGGER THRESHOLD REACHED | 1 0 1 1 | 1 1 0 | 1 0 1 1 | 1 0 1 0 | 1 0 1 1 |
| 7 | EXP. MECH. BLADES CLOSED MOTOR ENERGIZED S$_4$ CLOSED | 1 1 1 0 | 1 1 0 | 1 1 1 0 | 1 0 1 0 | 1 0 1 1 |
| 8 | S$_3$ CLOSES | 1 1 0 0 | 1 0 0 | 1 1 0 1 | 1 0 0 0 | 1 0 0 1 |
| 9 | S$_5$ CLOSES | 1 1 0 0 | 1 0 0 | 1 1 0 1 | 1 0 0 0 | 1 0 0 1 |

FIG. 7

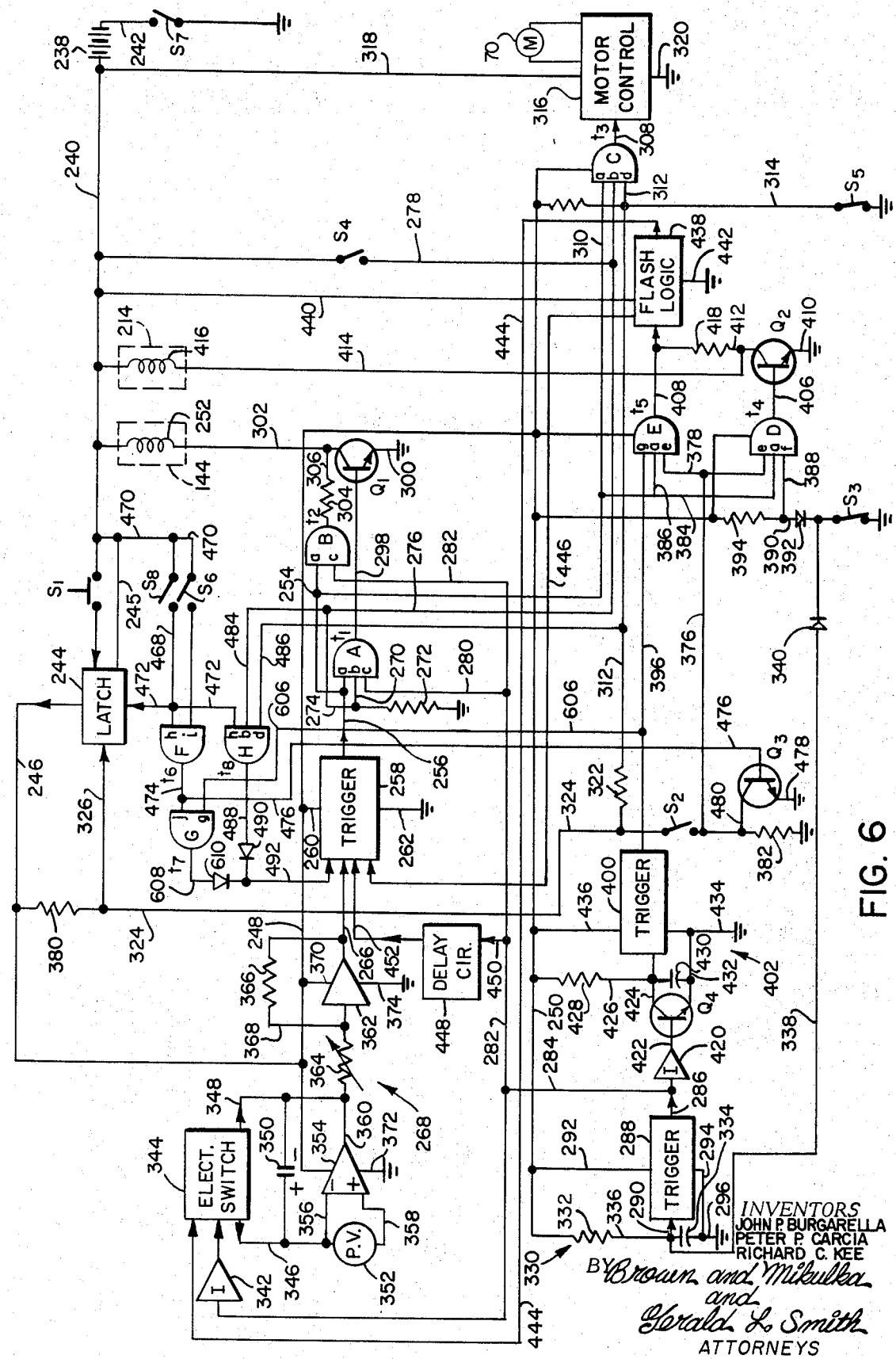

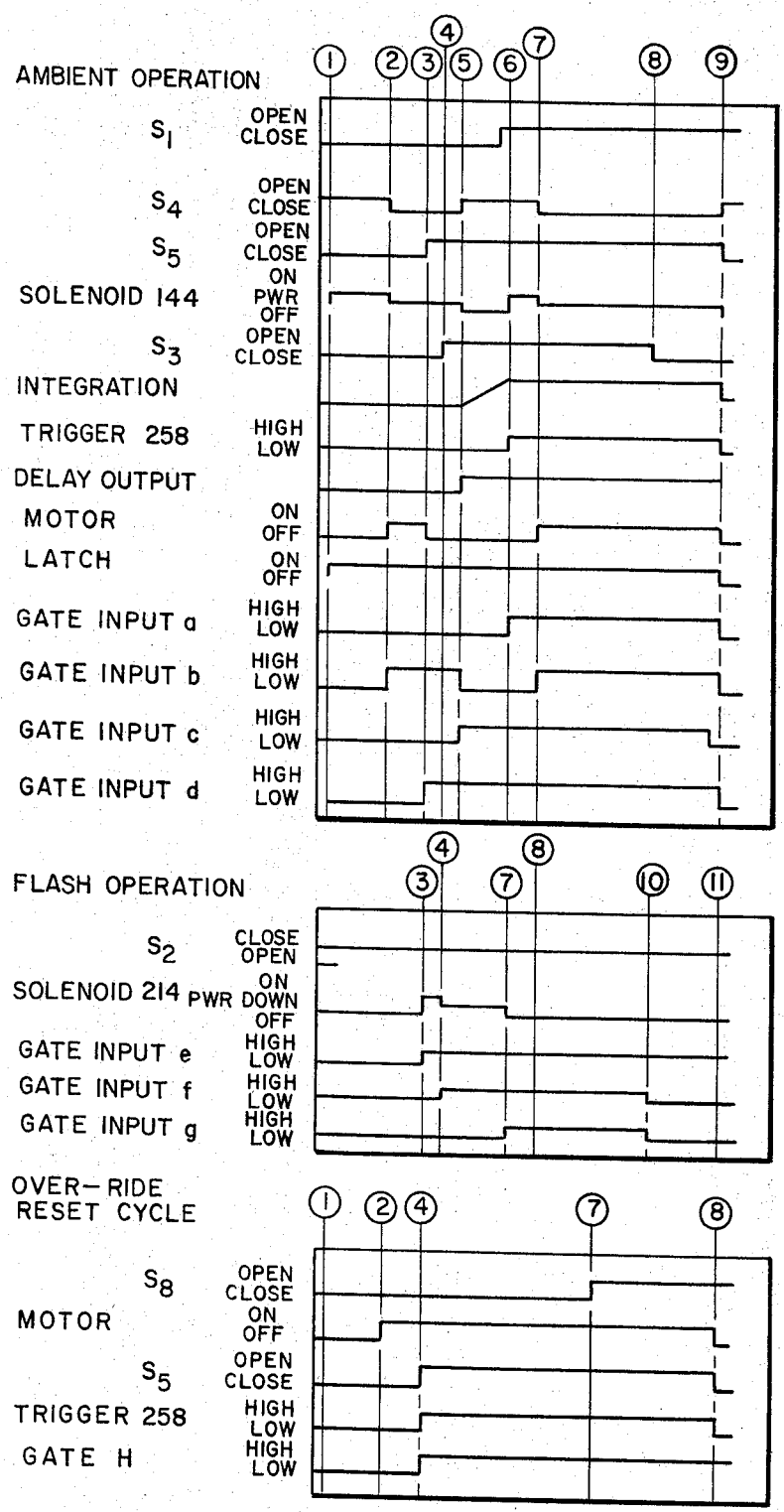

| | | GATE A | GATE B | GATE C | GATE D | GATE E |
|---|---|---|---|---|---|---|
| | | SOLENOID 144 POWER DRIVE | SOL.144 POWER DOWN | MOTOR CONTROL | SOL. 214 POWER DRIVE | SOL.214 POWER DOWN |
| | FLASH OPERATION EVENT SEQUENCE | a b c $t_1$ | a c $t_2$ | a b d $t_3$ | a e f $t_4$ | a e g $t_5$ |
| 1 | $S_1$ CLOSED AND SOLENOID ENERGIZED | 0 0 0 1 | 0 0 0 | 0 0 0 1 | 0 0 0 0 | 0 0 0 1 |
| 2 | $S_4$ CLOSED, MOTOR ENERGIZED | 0 1 0 0 | 0 0 0 | 0 1 0 0 | 0 0 0 0 | 0 0 0 1 |
| 3 | $S_5$ OPEN, MOTOR STOPS | 0 1 0 0 | 0 0 0 | 0 1 1 1 | 0 1 0 1 | 0 1 0 0 |
| 4 | $S_3$ OPENS, DELAY 190 COMMENCES | 0 1 0 0 | 0 0 0 | 0 1 1 1 | 0 1 1 0 | 0 1 0 0 |
| 5 | EXPOSURE MECHANISM BLADES COMMENCE OPENING | 0 1 1 0 | 0 1 1 | 0 1 1 1 | 0 1 1 0 | 0 1 0 0 |
| 6 | SWITCH $S_4$ OPENS | 0 0 1 0 | 0 1 1 | 0 0 1 1 | 0 1 1 0 | 0 1 0 0 |
| 7 | NETWORK 402 TIME-OUT DE ENERGIZE; SOLENOID 214; FIRE FLASH | 0 0 1 0 | 0 1 1 | 0 0 1 1 | 0 1 1 0 | 0 1 1 1 |
| 8 | EXPOSURE MECHANISM BLADES COMMENCE TO CLOSE | 1 0 1 1 | 1 1 0 | 1 0 1 1 | 1 1 1 0 | 1 1 1 1 |
| 9 | $S_4$ CLOSES, MOTOR ENERGIZED | 1 1 1 0 | 1 1 0 | 1 1 1 0 | 1 1 1 0 | 1 1 1 1 |
| 10 | $S_3$ CLOSES | 1 1 0 0 | 1 0 0 | 1 1 1 0 | 1 1 0 0 | 1 1 0 1 |
| 11 | $S_5$ CLOSES, MOTOR STOPS | 1 1 0 0 | 1 0 0 | 1 1 0 1 | 1 0 0 0 | 1 0 0 1 |

FIG. 10

| OVER-RIDE RESET CYCLE EVENT SEQUENCE | GATES A B C D E OUTPUT STATES | | | | | GATE F S8,S6 CONDITION SENSE | | | GATE G S8,S6 ANDED OUTPUT | | | GATE H S8,S5,S4 CONDITION SENSE | | | |
|---|---|---|---|---|---|---|---|---|---|---|---|---|---|---|---|
| | $t_1$ | $t_2$ | $t_3$ | $t_4$ | $t_5$ | h | i | $t_6$ | g | j | $t_7$ | b | d | h | $t_8$ |
| 1. $S_7$ CLOSED, LOADING DOOR CLOSED | 1 | 0 | 1 | 0 | 1 | 1 | 0 | 1 | 0 | 1 | 0 | 0 | 0 | 1 | 0 |
| 2. EXPOSURE MECHANISM BLADES CLOSED, MOTOR ENERGIZED | 0 | 0 | 0 | 0 | 1 | 1 | 0 | 1 | 0 | 1 | 0 | 1 | 0 | 1 | 0 |
| 3. $S_5$ OPENING | 0 | 0 | 1 | 0 | 1 | 1 | 0 | 1 | 0 | 1 | 0 | 1 | 1 | 1 | 1 |
| 4. ZERO EXPOSURE OVER-RIDE | 0 | 0 | 0 | 0 | 1 | 1 | 0 | 1 | 0 | 1 | 0 | 1 | 1 | 1 | 1 |
| 5. $S_3$ OPENS, MOTOR ENERGIZED | 0 | 0 | 0 | 0 | 1 | 1 | 0 | 1 | 1 | 1 | 1 | 1 | 1 | 1 | 1 |
| 6. $S_3$ CLOSES | 0 | 0 | 0 | 0 | 1 | 0 | 0 | 0 | 0 | 0 | 0 | 1 | 1 | 0 | 0 |
| 7. COUNTER AT "1"—$S_8$ OPENS | 0 | 0 | 0 | 0 | 1 | 0 | 0 | 0 | 0 | 0 | 0 | 1 | 1 | 0 | 0 |
| 8. $S_5$ CLOSES, MOTOR DEENERGIZED | 0 | 0 | 1 | 0 | 1 | 0 | 0 | 0 | 0 | 0 | 0 | 1 | 0 | 0 | 0 |

FIG. 12

| EMPTY CASSETTE LOGIC EVENT SEQUENCE | GATES A B C D E | | | | | GATE F | | | GATE G | | | GATE H | | | |
|---|---|---|---|---|---|---|---|---|---|---|---|---|---|---|---|
| | $t_1$ | $t_2$ | $t_3$ | $t_4$ | $t_5$ | h | i | $t_6$ | g | j | $t_7$ | b | d | h | $t_8$ |
| 1. $S_6$ CLOSED CLOSE $S_1$. | 1 | 0 | 1 | 0 | 1 | 0 | 1 | 1 | 0 | 1 | 0 | 0 | 0 | 0 | 0 |
| 2. NORMAL EVENT PROGRESSION TO TIME-OUT OF NETWORK 402 TRIGGER 258 FIRES | 1 | 0 | 1 | 0 | 1 | 0 | 1 | 1 | 1 | 1 | 1 | 0 | 1 | 0 | 0 |
| 3. $S_4$ CLOSES — MOTOR ENERGIZED TO COMPLETE PHOTOGRAPHIC CYCLE. $S_6$ REMAINS CLOSED | 0 | 0 | 0 | 0 | 1 | 0 | 1 | 1 | 1 | 1 | 1 | 1 | 1 | 0 | 0 |

FIG. 17

INVENTORS
JOHN P. BURGARELLA
PETER P. CARCIA
RICHARD C. KEE
BY Brown and Mikulka
and
Gerald L. Smith
ATTORNEYS INVENTORS
JOHN P. BURGARELLA
PETER P. CARCIA
RICHARD C. KEE
BY Brown and Mikulka
and
Gerald L. Smith
ATTORNEYS

PHOTOGRAPHIC CONTROL SYSTEM AND APPARATUS HAVING SELF-MONITORING FEATURES

BACKGROUND OF THE INVENTION

A thin and compact yet fully automatic hand held reflex camera is described in a copending application for U.S. Pat. entitled, "Reflex Camera", by E. H. Land, I. Blinow and V. K. Eloranta, Ser. No. 134,733, filed Apr. 16, 1971 and assigned in common herewith. Although intended for the general photographic market, the automatic camera necessarily is highly complex, being capable of performing a significant number of operational events in the course of a single photographic cycle. For example, during a pre-exposure phase of such a cycle, the control components of the camera are called upon to initially fully close an exposure mechanism. This activity secures the exposure chamber of the camera by blocking its taking optical path. When the exposure chamber is secured, a motor is energized for a short period of time to cause the unlatching of a reflex component, thereby enabling the component to be driven under spring bias from a viewing position at which it secured the exposure plane of the camera, into an exposure position reorienting the noted optical path for purposes of exposure.

Following the full seating of the reflex component at its exposure position, the photographic cycle continues into an exposure phase wherein dual parameter light responsive exposure control operations are carried out by the exposure mechanism. To terminate the exposure phase, the exposure mechanism again blocks the optical path and the photographic cycle continues into a post-exposure phase. In the latter operational phase, the noted motor is again energized and cocks the reflex component by driving it from its exposure position into its viewing position. Additionally, the driven instrumentalities of the camera remove an exposed film unit from the exposure chamber and process the unit through the driven rolls of a processing station.

Throughout the post-exposure phase of the photographic cycle, the exposure mechanism of the camera maintains an optical path blocking orientation. When the film unit has been processed and when the reflex component of the camera has been cocked into its viewing position, the exposure mechanism establishes an aperture of maximum available width or area.

For the type of use contemplated, the above catalogued series of operational events preferably are carried out at a rapid rate. Accordingly, cycle phase regulation is provided by a somewhat involved electronic circuit incorporating interdependent digital gate functions, the input signals to which must assume proper conditions or states in order for the circuit to initiate, carry out and terminate a given photographic cycle. At the completion of each photographic cycle, the gate input and output states are reset to an initial or standby logic condition so as to provide proper sequencing for a next succeeding photographic cycle.

When the complex mechanisms and related electronics of the automatic camera are considered in their entire panoply, the apparent complexity of such a device would appear to militate against its utility or appropriateness for every day use by inexpert members of the public-at-large. It follows, that a design assuring statistical reliability over a great number of photographic cycles and under a concomitant care and handling, ranging from overprotective to abusive, is required to realize a necessary practicality for the camera.

In the same sense, it is desirable, if not necessary, that the control system be somewhat forgiving in nature, accommodating for inadvertent error or improper operation procedures on the part of uninformed operators. The number of adjustments or observations required of the operator should be minimized to secure a high success rate of picture taking and justify a complex system within an everyday camera. For instance, a flashlamp may be left in firing position and the camera actuated when its film supply is exhausted, thereby wasting the light source. Similarly, moving components of the camera mechanism inadvertently may be jammed or interferred with in the course of a photographic cycle, thereby interferring with its predetermined sequence of operations. For instance, the reflex component which is called upon to mechanically reorient the taking optical path of the camera with considerable precision might be halted by an obstruction.

Operation of the camera under extreme or undesirable environmental conditions may result in the introduction of unwanted foreign matter into its mechanisms or in the misaligning of film supplies and the like, leading to an operational halt. Also, under extreme low temperature conditions, the battery power supply of the camera might fail in mid-cycle so as to require a somewhat complex correction procedure.

A number of operational failures can be envisioned for such a complex mechanism and one operational event may be more prone to failure under a given improper use, while another operational function may be prone to fail under a different circumstance. Accordingly, the control system of the camera should be capable of accommodating for a variety of unusual operational adversities.

In order for the control circuit to accommodate for possible disruptions in the operation of mechanical components, it is desirable that it not operate in isolation from them. In effect, a form of cycle phase monitoring is required and this requirement necessitates the presence of an electrical-mechanical interface. Such an interface functions to supply operational status data to the digital gate-type control circuit. While transducer techniques may be capable of serving a monitoring function throughout a photographic cycle, in the event of an operational malfunction, they may disrupt the signal input logic of the control system. As a consequence, the camera would be disabled and it is not improbable that typical operators would be unable to cope with necessary procedures for correcting malfunctions and resetting the control circuit.

Another requirement for automatic cameras of the noted requisite practicality is one permitting "dry runs" or actuation of the camera without the presence of a film supply. Should a complex monitoring system be present within the camera, provision for such test actuations may be impractical.

SUMMARY OF THE INVENTION

The present invention is addressed to a highly automatic reflex camera, the control system of which includes self-monitoring features enabling its reliable performance and utility under a broad variety of operating conditions. While the camera does incorporate a somewhat sophisticated cycle control circuit, control logic interruptions occasioned by improper use or for mechanical interference are accommodated readily by a simplified reset procedure. Such simplified procedure is available, inter alia, through a unique positioning of monitoring transducers within the electrical-mechanical interface of the camera. The camera apparatus also includes features uniquely accommodating for operational oversights which may occur during its use.

A further feature and object of the invention is to provide photographic apparatus of a variety operative to carry out a sequence of operational events in a predetermined order defining a photographic cycle having a pre-exposure phase, an exposure phase, and a post-exposure phase. The apparatus includes a reflex operator or component which moves during the pre-exposure phase from a viewing to an exposure position. Once seated at the latter position, the exposure phase of the photographic cycle is carried out through the use of an exposure control system which evidences a predetermined or given output condition representing the termination of exposure interval and of the exposure phase.

The cycle control system of the apparatus responds in correspondence with the movement of the noted reflex component from its viewing position and substantially into its exposure position to monitor the carrying out of certain operational events defining the noted pre-exposure phase, as well as for actuating the exposure control system to establish the exposure phase of the camera. The cycle control system is further responsive to the noted output condition of the exposure control system to effect the carrying out of the post-exposure phase of a photographic cycle.

The apparatus further includes override means which is selectively actuated to command the exposure control system to assume the noted predetermined or given output condition so as to cause the carrying out of the post-exposure phase of a photographic cycle. With this arrangement, the apparatus may be reset to an initial or standby condition following a non-programmed interruption of any given photographic cycle.

A further feature and object of the invention is to provide the above described override arrangement in conjunction with the basic procedure of loading and unloading film within the apparatus. For instance, the override feature is actuated in conjunction with the removal of a film laden cassette from a receiving chamber within the apparatus and subsequent insertion and securing of such a cassette therein. Upon closing an access loading door, or the like, following the noted subsequent insertion of a cassette, the override resetting feature is automatically carried out.

Another object of the invention is to provide the above-described override feature in conjunction with an exposure counter or monitor normally operative to record and display the number of photographic cycles expended for any inserted supply of film. More particularly, the override feature may be present, inter alia, as a switch which responds to a condition of the counter or monitor as it exists when a film supply is removed from the apparatus.

Another aspect and object of the invention is to provide for the suppression of a flashlamp ignition subsystem within the control system of the camera whenever the noted override feature is actuated. With such an arrangement, inadvertent wasting of a flash light-source mounted upon the apparatus is obviated.

Another feature and object of the invention is to provide reflex photographic apparatus which is operative to carry out an involved sequence of operational events defining a photographic cycle. The apparatus includes an exposure chamber within which is positioned a reflex operator or component which is movable during the course of a photographic cycle between a viewing position, establishing an optical path from a taking lens to a viewing surface, and an exposure position, reorienting the optical path to extend from the taking lens to an exposure plane. The apparatus further includes driven instrumentality means which is actuable during a photographic cycle initially to move the reflex component from its viewing into an exposure position and thereafter is actuable to return the reflex component to the noted viewing position. The apparatus further includes a transducer, present in the form of a switch, having an output condition which corresponds to orientations of the reflex component both at its viewing position and locations closely proximate thereto.

A second transducer, in the form of a switch $S_3$, is also present in the apparatus. This second transducer has an output condition which corresponds with orientations of the reflex component as it moves proximate and into its exposure position. The control system of the apparatus is designed to respond to the output condition of the second transducer to effect the carrying out of the exposure phase of a photographic cycle. Through the use of such second transducer actuation, the cycle control system of the apparatus can be constructed in a manner permitting a shorter time span for any given photographic cycle. In one embodiment, the second transducer operates in conjunction with a timing network having a time constant selected for permitting the reflex component to fully seat in its exposure position. By so positioning the second transducer so as to be actuated only when the reflex component is proximate its exposure position, the total delay time which the cycle control system must provide for optical path conversion, so as to accommodate for variations in component movement, is significantly reduced.

In a preferred embodiment, both of the above described transducers are operated from the driven instrumentality of the camera. This instrumentality, incorporating a translationally movable ram, permits the override feature of the apparatus to impose a post-exposure logic even though the reflex component may be jammed in an improper position.

Another aspect and object of the invention resides in the provision of a third transducer arranged for actuation in response to the initial operational event of blocking the optical path of the apparatus. Thus responsive, the third transducer provides an early monitoring feature allowing, in the event of malfunction, cycle shutdown before the uncovering of the exposure plane of the apparatus. Without such monitoring, a film unit, or the like, would be unnecessarily exposed and wasted. The presence of three transducers in the above described locations also provides a three aspect monitoring of the pre-exposure phase of a photographic cycle.

Other objects of the invention will in part be obvious and will, in part, appear hereinafter.

The invention, accordingly, comprises the apparatus possessing the construction, combination of elements and arrangement of parts which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 1 is a pictorial view of a fully automatic hand-held camera incorporating the self-monitoring features of the instant invention, the view having portions broken away to reveal internal structure;

FIG. 2 is a perspective view of a cassette structure insertable within the camera of FIG. 1;

FIG. 3 is a fragmentary plan view of an exposure mechanism incorporated in the camera of FIG. 1;

FIG. 5 is a partial pictorial representation of transducer features of the camera of FIG. 1 with portions broken away to reveal internal structure;

FIG. 6 is a schematic diagram of a control circuit used in conjunction with the control system of the camera of FIG. 1;

FIG. 7 is a truth table or schedule of operational events performed by the control system of the camera of FIG. 1, showing, in logic form, the input and output states of gate functions incorporated within the circuit of FIG. 6 as it operates under ambient lighting conditions;

FIG. 8 is an energization status chart for various components of the circuit of FIG. 6 as they operate throughout a photographic cycle under ambient illumination conditions;

FIG. 10 is a truth table or schedule of operational events performed by the control system of the camera of FIG. 1, showing, in logic form, the input and output states of gate functions of the circuit of FIG. 6 when that circuit is operated for flash mode performance;

FIG. 11 is an energization status chart for various components of the circuit of FIG. 6 as they operate in a flash mode;

FIG. 12 is a truth table for operational events performed by the control system of the camera of FIG. 1, showing, in logic form, the input and output states of gate functions incorporated within the circuit of FIG. 6 as it is operated in override reset fashion;

FIG. 13 is an energization status chart for various components of the circuit of FIG. 6 as they operate in override reset fashion;

FIG. 17 is a truth table for operational events performed by the control system of the camera of FIG. 1, showing, in logic form, the input and output states of gate functions incorporated within the circuit of FIG. 6 as it operates in conjunction with an exhausted film supply;

DETAILED DESCRIPTION

Figure 4:
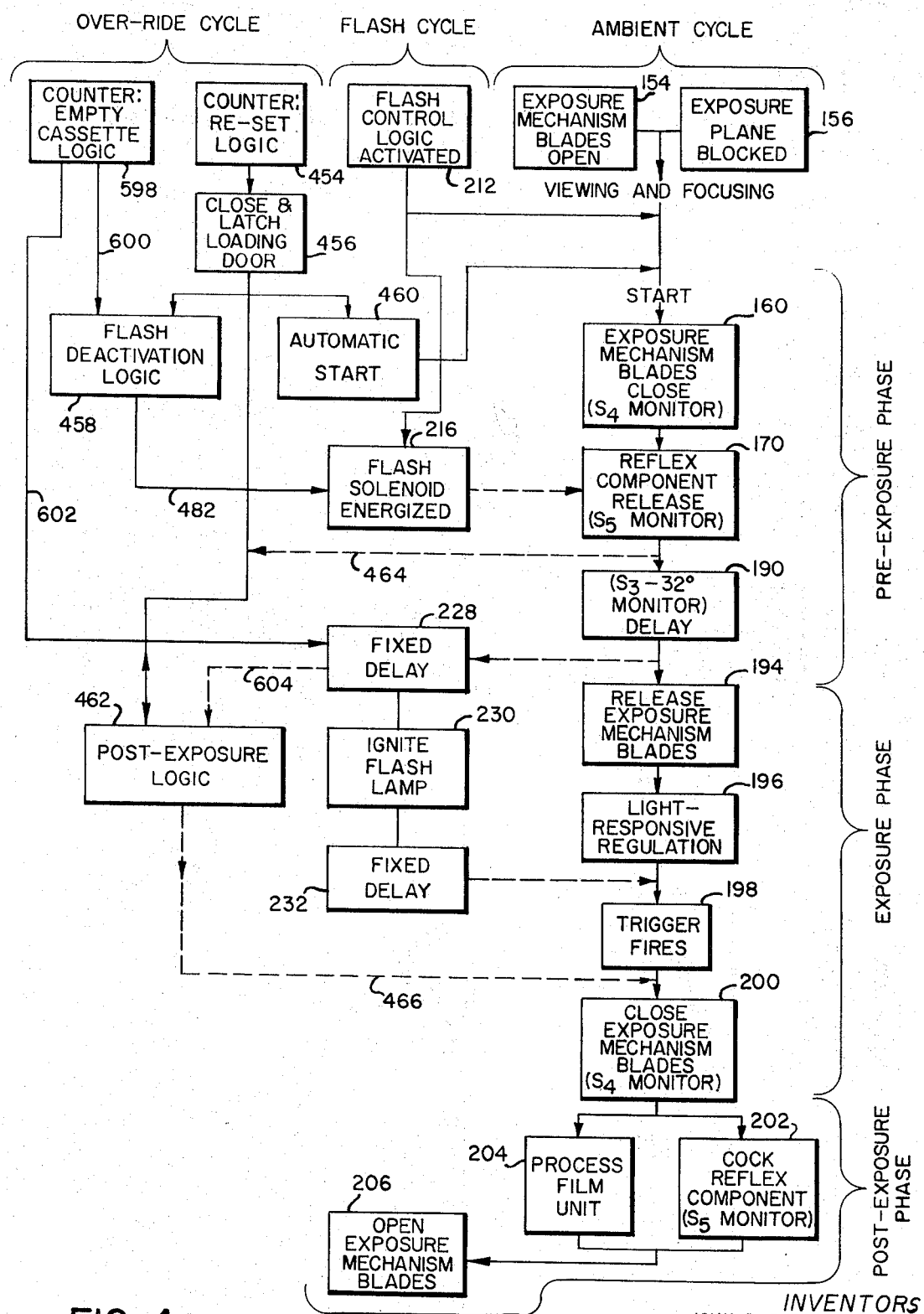
FIG. 4 is a block logic diagram showing the sequence of events occuring during operational cycles of the camera of FIG. 1.

In the description to follow, a reflex photographic camera which performs a somewhat elaborate series of operational events in the course of a photographic cycle is discussed. Inasmuch as the control system for the camera operates in both a flash mode as well as in an ambient illuminational mode, the description necessarily incorporates discussion of both in order to illustrate monitoring and reset features. To aid in understanding cycle variations, a block logic diagram graphically illustrating camera performance for different operational modes is referred to intermittently as the description unfolds.

Camera and Cassette - General Structure

Referring to FIG. 1, a fully automatic reflex camera incorporating the features of the instant invention is portrayed generally at 10. The several articulated housing components of camera 10, including rear wall 12, forward wall 14, and exposure control housing 16 are pivotally associated with a base 18 so as to be foldable thereinto in nesting fashion. When so folded from the erected configuration shown, the camera 10 assumes a thin and compact shape suiting it to be conveniently carried in the pocket of a garment. The specific hinge connections providing for the articulated structure, while not being visible in the figure, are positioned at axes 20, 22, 24 and at the lower rear portion of exposure housing 16.

When erected for making an exposure, rear wall 12, forward wall 14 and exposure control housing 16 combine in conjunction with an opaque flexible bellows, a fragment of which is illustrated at 26, to define an exposure chamber generally depicted at 28.

Base 18 includes an inner frame assembly, a portion of which is shown at 30. Inner frame assembly 30, as well as the outward portions of base 18, cooperate to provide structural support for numerous instrumentalities of the camera. For instance, frame 30 is configured to define a receiving chamber for retaining and securing a film laden cassette or container 32 at the bottom of exposure chamber 28.

Looking additionally to FIG. 2, cassette 32 is of generally flat, rectangular shape and contains a stacked assemblage of photographic units, one of which is shown at 34. Photographic or film units 34 are arranged for sequential presentation at a light entrance portion 36 formed in the upper surface of cassette 32. Entrance portion 36 has a periphery which is defined by ridge 38, the underside of which serves as a seat against which the uppermost unit 34 abuts. The forward wall of cassette 32 is formed having an elongate slot 40 disposed thereacross. Slot 40 serves as an egress means providing for the sequential removal of each film unit 34. Cassette 32 also is formed having slots or openings in the upward face thereof as at 42. Slots 42 permit the insertion of a component of a pick mechanism which functions to impart initial movement to units 34 as they are removed from the container.

As shown in FIG. 1, cassette 32 is slidably receivable into a receiving chamber formed within base 18 and so configured such that the uppermost one of film units 34 is automatically positioned at the exposure plane of camera 10. When the cassette 32 is inserted, a loading access door, shown generally at 44, is pivoted downwardly to reveal an access opening of the receiving chamber.

Camera 10 operates in a modifed reflex fashion, being convertible between viewing and exposure operational modes by a reflex assembly, including an operator arrangement formed as a somewhat planar reflex reflecting component 50. Shown at an intermediate position evidenced during a transition from one terminal position to another, the component 50 is configured having a mirror surface 52, mounted upon its underside, and a viewing surface 54, positioned upon or forming its upward surface. In the course of a photographic cycle, reflex component 50 is moved from a viewing position against ridge 38 of cassette 32, where it serves to secure light entrance portion 36, to an exposure position abutting against a mirror 56 located upon the innerside of rear wall 12. Movement between the viewing and exposure positions is pivotal, the component 50 being coupled to inner frame 30 at hinges 58 and 60.

When component 50 is positioned over ridge 38 of cassette 32, to secure the exposure plane of the camera, a viewing mode optical path is established. This path extends from a taking lens mounted at 64 in exposure housing 16, through an exposure mechanism depicted generally at 66, which establishes an aperture opening of maximum available width, thence to the reflecting surface of mirror 56 at the rear of the camera and thence to viewing surface 54 on the upward side of component 50. Viewing surface 54 is configured having a texture and optical design facilitating the focusing of the image of the scene to be photographed. This image may be viewed by the camera operator through a collapsible optical viewing assembly depicted generally at 68. A configuration suited for viewing surface 54 is described and claimed in a copending application for U.S. Pat., Ser. No. 83,030 filed Oct. 22, 1970 by Nathan Gold, entitled, "Reflective Imaging Apparatus" and assigned in common herewith, while the assembly 68 and its related internal components are described in detail in a copending application for U.S. Pat. by James G. Baker, filed Dec. 15, 1970, entitled, "Reflex Camera and Viewing Device", Ser. No. 98,356 and assigned in common herewith.

The exposure mode optical path orientation of camera 10 is established by pivoting reflex component 50 substantially against the inner surface of rear wall 12. In this orientation, the optical path now extends from taking lens 64 and exposure mechanism 66 to mirror 52, positioned on the underside of reflex component 50, thence to the uppermost one of the film or photographic units at 34, positioned within cassette 32 at the exposure plane of camera 10.

Figure 15:
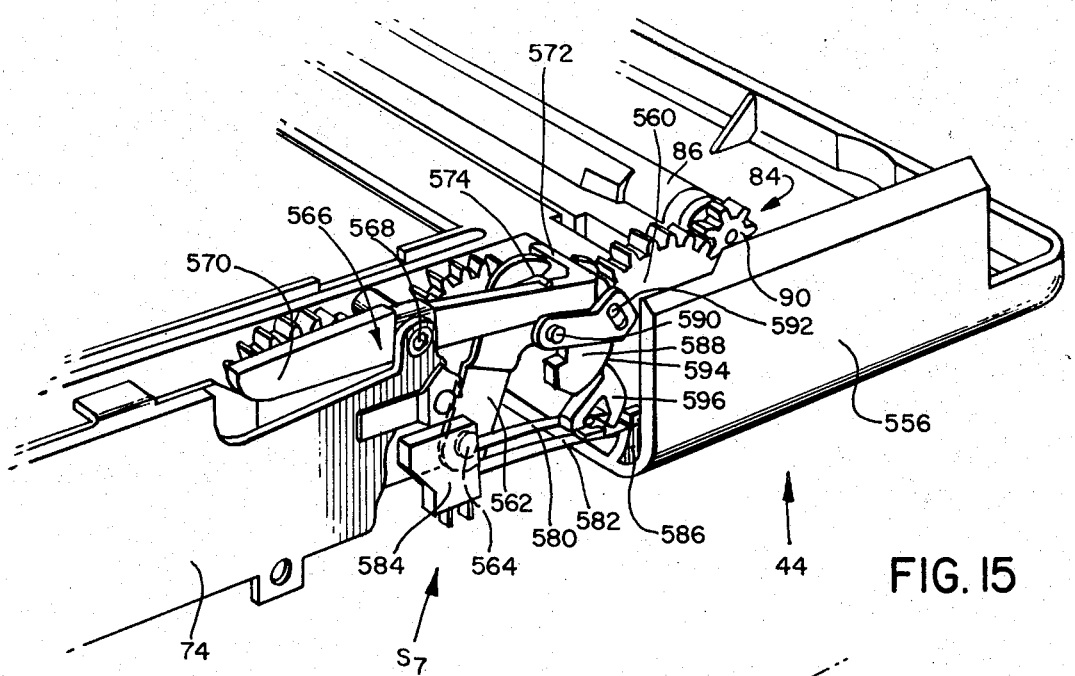
FIG. 15 is a partial perspective view of the forward portion of the base of the camera of FIG. 1, with portions broken away to reveal internal structure.

During a viewing operational mode, exposure mechanism 66 defines an aperture of maximum available light transmissibility while reflex component 50 is held in a light securing position over light entrance portion 36 of cassette 32. Component 50 is retained in that position by a driven instrumentality operating through hinge 58. Described in detail and claimed in a copending application for U.S. Pat. by E. H. Land, I. Blinow and V. K. Eloranta, entitled, "Reflex Camera", Ser. No. 134,733, filed Apr. 16, 1971 and assigned in common herewith, the driven instrumentality is regulated from a control system which utilizes the output of a motor 70 to selectively drive an elongate, thin gear train, certain components of which are shown generally at 72, extending along one side of camera 10. The various geared components of gear train 72 are rotatably mounted upon camera 10 between inner frame 30 and an outer plate 74 (FIG. 15). Two reduction ratio circuits are present in gear train 72, one such circuit terminating in a phase control cam 76 which is rotatably driven through one revolution during the course of a single photographic cycle. Cam 76 operates in conjunction with a cam follower 78, positioned upon the inwardly facing side of an elongate ram or actuator 80. Ram 80 is slidably mounted for movement along gear train 72 between the outer face thereof and outer plate 74 and is drivably connected to an input bell crank 82 mounted, in turn, at the rear of camera 10. Input bell crank 82 is connected by a spring linkage to reflex component 50 at hinge 58. As is described in detail in the noted application for Patent, Ser. No. 134,733, this spring linkage provides a drive spring feature utilized to drive component 50 into its exposure position, as well as an override spring system feature permitting cocking operations to proceed, even though component 50 may be jammed or stuck in an upward position, for instance against mirror 56.

The position of reflex component 50 throughout any given photographic cycle is controlled by select energizations of motor 70 and consequent rotation of phase control cam 76. For instance, when camera 10 is in a viewing mode orientation, cam follower 78 and ram 80 serve to retain reflex component 50 in its exposure plane securing position over ridge 38 of cassette 32. When reflex component 50 is so retained, cam 76 is in a radial orientation wherein it holds follower 78 and associated ram 80 at a terminal rearward position against the bias asserted by the noted spring linkages utilized to drive component 50 and exerted through input bell crank 82. A controlled energization of motor 70 early in a given photographic cycle causes the gear train 72 to rotate cam 76 to a position whereat follower 78 releases from contact therewith, permitting ram 80 to be driven in correspondence with reflex component 50 by the noted drive springs into their respective terminal positions. Note in this regard, that ram 80 and reflex component 50 operate in corresponding synchronism, ram 80 serving as a dynamic tracking device.

Following exposure mode operation, a post-exposure phase of a photographic cycle is carried out by re-energizing motor 70 to drive gear train 72, thereby rotating phase control cam 76. As cam 76 is rotated, contact is reasserted with follower 78 to drive ram 80 rearwardly and cock reflex component 50 into its viewing position. Simultaneously with this cocking activity, a second reduction circuit within gear train 72 functions to drive a processing station shown generally at 84. Station 84 is comprised of two cylindrical rolls 86 and 88 mounted within loading access door 44. Roll 86 of the station is connected with gear train 72 through a drive pinion 90.

At the commencement of the noted second energization of motor 70, while roll 86 is being driven, a pick mechanism illustrated generally at 92 is actuated to engage the uppermost photographic unit 34 and to move it through forwardly disposed egress slot 40 and into the bite or point of tangency between rotating processing rolls 86 and 88 of station 84. Described in detail in a copending application for U.S. Patent, Ser. No. 171,127 by E. H. Land, entitled "Film Advancing Apparatus", filed Aug. 12, 1971 and assigned in common herewith, mechanism 92 includes a carriage assembly 94 which is selectively driven from a cam (not shown) present within gear train 72. Slidably mounted upon inner frame 30 by pin and slot assemblies, a typical one of which is shown at 96, carriage 94 is configured supporting a resilient pick member 98. The outer tip 100 of pick member 98 is configured to extend into and slide along slot 42 of cassette 32. Carriage 94 is spring biased to position tip 100 at the rear of slot 42 of cassette 32. At this position, tip 100 engages the rear edge of a photographic unit 34. When cam driven from gear train 72, the assembly of carriage 94 and pick 98 moves the uppermost one of photographic units 34 through slot 40 until it is engaged by the rolls of processing station 84. Carriage 94 is latched at its forwardmost position following performance of its pick function and is returned under spring bias to its rearward station at the completion of the photographic cycle.

Photographic units 34 are processed by passing through rolls 86 and 88 of processing station 84. Described in detail in a U.S. Patent by E. H. Land, No. 3,145,644, these units are structured to contain a processing fluid which is spread therewithin to cause the formation of a visible positive image.

Camera - Exposure Mechanism

The exposure control system of camera 10 is called upon to perform a number of operational steps in the course of a photographic cycle. For instance, to permit optimum viewing and focusing, the mechanism 66 establishes an aperture opening of maximum width or light transmissibility. During the conversion of the optical path of camera 10 from a viewing mode to an exposure mode orientation, mechanism 66 is called upon to secure exposure chamber 28 by remaining in a fully closed condition. Further, in the course of an exposure interval, the mechanism 66 and its related control provides for a dual exposure parameter regulation in which both aperture and exposure interval are controlled in accordance with a predetermined, optimized photographic program. For instance, under such a program, relative aperture should be selected automatically to optimize depth of field, while exposure interval is selected to maximize taking speed.

Looking additionally to FIG. 3, exposure mechanism 66 is shown to be formed having two blades, 110 and 112, which slideably ride in a track (not shown) mounted within exposure housing 16. Each blade, 110 and 112, is formed having a teardrop shaped aperture opening as shown, respectively, at 114 and 116. Additionally, the blades are formed having secondary openings, shown respectively at 118 and 120, (FIG. 1) which move in synchronism with openings 114 and 116 before the detecting elements of a photosensing network positioned behind an entrance optical assembly 122. Openings 114 and 116 of respective blades 110 and 112 are positioned for movement across the optical path of camera 10 as it is established at taking lens 64. Depending upon the position of blades 110 and 112, openings 114 and 116 symmetrically overlap to define selectively varying aperture sizes. Secondary openings 118 and 120 are configured somewhat in correspondence with the contours of respective openings 114 and 116. These secondary openings also move in mutual symmetry over the optical path of the light sensing network.

Blades 110 and 112 are moved in mutual symmetry as a result of their connection with a walking beam shown at 124. Walking beam 124 is formed having a centrally disposed hub portion 126 which is journaled for rotation about an upstanding stud (not shown) extending from the rearward portion of exposure control housing 16. Elongate slots, as at 128 and 130, are formed in the tip portions of walking beam 124 for the purpose of providing connection with pins 132 and 134 extending, respectively, from blades 110 and 112.

Walking beam 124 is biased for rotation toward a terminal position. This bias is derived from a spring 136, the central portion of which is wound about hub 126. The movable end 138 of spring 136 is configured for biasing contact against walking beam 124, while its stationary end 140 is configured to abut against a pin 142 extending from a rear portion of exposure control housing 16. With spring 136 so connected, the exposure mechanism is biased for moving blades 110 and 112 into a normally open orientation wherein openings 114 and 116, as well as 118 and 120 cooperate to define widest available apertures. This fully open aperture condition of mechanism 66 is shown in FIG. 3.

Movement of blades 110 and 112 from their normally open orientation, permitting viewing and focusing, into a closed orientation, blocking the passage of light along the optical path of the camera 10, is carried out by a tractive electromagnetic drive present as a solenoid 144 mounted within exposure control housing 16 through a magnetic circuit completing bracket as at 146. Solenoid 144 is designed having an internally disposed cylindrical plunger or armature 148 which retracts inwardly within an excitation winding upon energization thereof. Plunger 148 is connected through a pin (not shown) and comb-shaped connector 150 to one side of walking beam 124.

When solenoid 144 is energized to retract plunger 148, walking beam 124 is rotated rapidly against the bias of spring 136 to move blades 110 and 112 into the fully closed orientation shown in FIG. 1. Note in FIG. 1 that the optical path of camera 10, as it is extensible through the taking lens at 64, is completely blocked, thereby securing exposure chamber 28 from the presence of light.

Ambient Cycle Operation

Referring additionally to FIG. 4, the operational event sequence defining a photographic cycle as camera 10 operates under ambient illuminational conditions is displayed in block logic form. For instance, upon erecting camera 10 to the configuration shown in FIG. 1, the operator views and focuses a scene to be photographed through optical entrance assembly 68. To optimize this viewing, the blades 110 and 112 of exposure mechanism 66 are fully open as depicted at function block 154. Additionally, the exposure plane of the camera is blocked by reflex component 50 as it is positioned over ridge 38 of cassette 32. The latter viewing condition is depicted by function block 156. Following viewing and focusing, a photographic cycle is commenced with the depression of a start button 158 located on the forward face of exposure control housing 16. Depression of this button closes appropriate switching to energize the control system of the camera which, in turn, effects the energization of the winding of solenoid 144. When so energized, solenoid 144 drives blades 110 and 112 to the closed position shown in FIG. 1. The depression of start button 158 and initial closure of the exposure mechanism blades, as depicted at function block 160, commences a pre-exposure phase of the photographic cycle. The extent of this phase and succeeding ones is bracketed and labeled in FIG. 4.

As exposure mechanism blades 110 and 112 are driven to their light blocking position, leaves 162 and 164 of a switch generally designated as $S_4$ are closed. As revealed in FIG. 3, switch $S_4$, additionally includes an insulative base 166 fixed to an inner frame portion of exposure control housing 16. Switch $S_4$ serves a transducer-monitor function and closure of its leaves 162 and 164 is carried out when an insulative contact 168 connected to walking beam 124 drives leaf 162 into contact with leaf 164. The position of walking beam 124 when closure of switch $S_4$ is effected is shown in phantom in FIG. 3 at 124'. Note that switch $S_4$ is not closed until blades 110 and 112 fully block the optical path of camera 10.

When blades 110 and 112 block the optical path of camera 10 and transducer switch $S_4$ assumes a predetermined monitoring condition by virtue of its closure, exposure chamber 28 is secured and operational mode conversion is permitted to take place. Accordingly, as indicated at function block 170, the control system of camera 10 operates to release reflex component 50. To carry out this release, the control system energizes motor 70 for a short period of time to actuate gear train 72, thereby driving phase control cam 76 a sufficient amount to release ram 80 for movement. When so released, ram 80 permits the drive springs associated with hinge 58 to move both the ram 80 and reflex component 50 toward their terminal exposure positions.

Referring additionally to FIG. 5, as ram 80 commences forward movement in conjunction with the noted release, a tab 172 extending inwardly therefrom releases from engagement with the insulative cap 174 of a resilient leaf 176 of a switch identified generally as $S_5$. Switch $S_5$ additionally includes a resilient leaf 178 which is supported along with leaf 176 from an insulative base 180 fixed to outer plate 74 of base 18. Accordingly, the contacts 176 and 178 of switch $S_5$ are opened in correspondence and synchronism with the initial movement of component 50 from its viewing position. With such an arrangement, switch $S_5$ serves as a transducer form of monitor, the open condition of which signals that reflex component 50 has been released and is proceeding towards its exposure position.

The spring biased rotational travel of reflex component 50 about its hinges 58 and 60 into its seated exposure position entails about 37°. When reflex component 50 somewhat closely approaches its seated position against rear wall 12, i.e. at about 32°, tab 172 contacts the insulative cap 182 of a resilient leaf 184 of another switch depicted generally as $S_3$. Leaf 184 is normally in contact with a second leaf 186 of switch $S_3$ and both leaves are supported from an insulative base 188, also fixed to outer plate 74. Serving as another transducer stage for monitoring the movement of reflex component 50, the open contacts of switch $S_3$ provide a signal condition evidencing that the component 50 has approached its seated position. Should any interference be encountered during the rotational movement of component 50, the corresponding and synchronous travel of ram 80 will be effected to delay or hold the actuation of switch $S_3$. Once the leaves 184 and 186 of switch $S_3$ are open, the control system of the camera provides a delay function as indicated at block 190 of FIG. 4. This delay is predetermined, being selected to accommodate for any dynamic instability such as bouncing or the like which reflex component 50 may exhibit against its seated position at rear wall 12.

Figure 9:
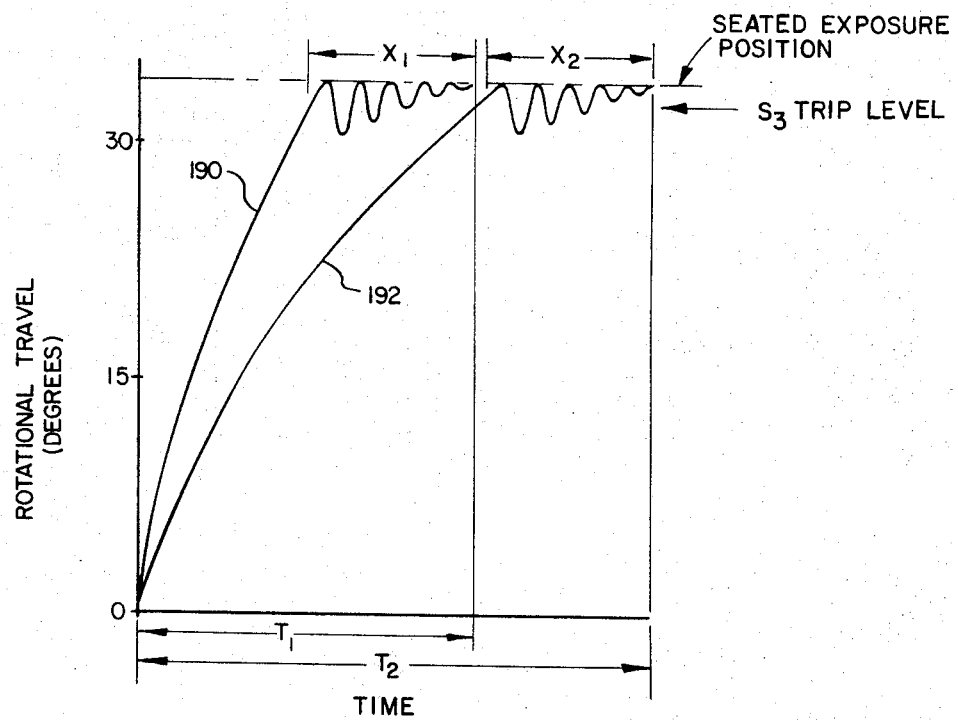
FIG. 9 is a chart showing relative rotational travel times for a reflex component of the camera of FIG. 1.

In addition to providing monitor information that reflex component 50 has reached a location proximate its seated position, transducer switch $S_3$, being so located, also provides an improved technique for deriving the requisite optical path conversion timing. Referring momentarily to FIG. 9, a graph showing angular travel vs. time for two different excursion rates for reflex component 50 is illustrated. A curve 190 for one excursion time is shown to require a total lapsed time $T_1$ for the component to fully seat at its exposure position. As shown in the figure, when switch $S_3$ is tripped at 32°, a period $x_1$ is required to accommodate for full damping of component 50 at its seated position. Due to vaguaries within the drive system, component 50 may require a longer travel time and exhibit a travel characteristic as shown at 192. This characteristic travel would require a total lapsed travel time as designated at $T_2$. Note that the lapsed time $T_2$ is considerably greater than that at $T_1$ and, should the delay function 190 be initiated when component 50 leaves its viewing position, an undesirably lengthened time-out would be required to account for all possible drive characteristics variations. It may be noted, however, that the time span $x_2$ required for the component 50 to fully damp after it has passed the 32°, $S_3$ monitor position includes only a small increment of additional time than the corresponding damping time for an excursion as identified at $x_1$ for curve 190. As a consequence, the timing window required for delay function 190 is much smaller and overall photographic cycle operation can be designed to be carried out in a correspondingly shorter period of time. Note in the latter regard that the lapsed time span for delay 190 would be the longer of the statistical periods measured as at $x_1$ or $x_2$.

Returning to FIGS. 1–4, upon appropriate time-out of delay 190, the control system of camera 10 is signaled to start the exposure phase of its photographic cycle. This phase is commenced upon the deenergization of the excitation winding of solenoid 144, thereby permitting spring 136 to drive blades 110 and 112 toward a terminal position representing maximum aperture opening. Such release is depicted at function block 194 in FIG. 4. Simultaneously with this movement of blades 110 and 112, the light sensing network of the control system evaluates scene lighting from entrance assembly 122 as it is affected by moving openings 118 and 120. (See FIG. 1) This light-responsive regulation function is depicted at block 196. When the control system evaluation function determines that the exposure interval should be terminated, a trigger within the circuit thereof is fired, as depicted at function block 198, and the excitation winding of solenoid 144 is again energized to retract plunger 148 and rapidly close blades 110 and 112. This exposure terminating function concludes the exposure phase of a given photographic cycle and is depicted at block 200. The post-exposure phase of the photographic cycle now commences as switch S₄ is again closed by virtue of the contact of leaf 162 with insulative contact 168 of walking beam 124.

Energization of the excitation winding of solenoid 144 continues throughout the post-exposure phase in order to secure exposure chamber 28 during ensuing movement of reflex component 50. The latter reorientation of component 50 is carried out by re-energizing motor 70 to drive gear train 72 and thereby rotate phase control cam 76. As cam 76 is rotated, contact is reasserted with follower 78 to drive ram 80 rearwardly and cock reflex component 50 toward its viewing mode position as depicted at function block 202. As depicted generally at function block 204, simultaneously with the above-described cocking activity, the second reduction circuit of gear train 72 drives roll 86 of processing station 84 and actuates pick mechanism 92. Mechanism 92 serves to urge uppermost film unit 34 from cassette 32 and into the bite of rotating rolls 86 and 88.

At the termination of the above-described cocking and processing functions, the control system of camera 10 is automatically shut down to terminate the photographic cycle. Such shut-down de-energizes the excitation winding of solenoid 144 to permit blades 110 and 112 to open under the bias of spring 136. The latter event is depicted in FIG. 4 by function block 206.

The noted shut-down is carried out in response to the opening of switch S₅ by tab 172 of ram 180. Transducer switch S₅ serves to close down the control system in response only to the movement of ram 80. Accordingly, should reflex component 50 be jammed or inadvertently held in an elevated position, camera 10 will complete a photographic cycle. Override springs extant between bell crank 82 and hinge 58 permit this cycle completion without injuring the mechanisms of the camera. At such time as any jamming or the like is corrected, the reflex component 50 will be spring driven into its viewing position. The latter feature is described in the noted application for patent, Ser. No. 134,733.

Flash Cycle Operation

In the discussion above, a photographic cycle of camera 10 has been described as it relates to operation under ambient lighting conditions. To operate camera 10 with artificial or flash illumination, a packaged multilamp flash assembly such as that shown at 210 is mounted upon exposure housing 16. When so mounted, assembly 210 serves to arm or activate a flash control logic within the control system of the camera. FIG. 4 depicts a resultant flash photographic cycle, the noted control logic activation being depicted by function block 212. As shown in that drawing, a flash cycle includes a series of additional operational events which add to or bypass those suited for ambient performance. For instance, following viewing and focusing and depression of start button 158, the excitation winding of solenoid 144 is energized to close mechanism blades 110 and 112 as shown at function block 160. As reflex component 50 is released and switch S₅ is opened, the excitation winding of a second, follow-focus solenoid 214 forming part of exposure mechanism 66 is energized. Such energization is depicted at function block 216 in FIG. 4. Solenoid 214 represents the drive component of a follow-focus mechanism described in detail and claimed in a corresponding application for U.S. Patent by L. M. Douglas entitled, "Apparatus and System for Flash Photography," Ser. No. 168,671, filed Aug. 3, 1971, and assigned in common herewith. This follow-focus mechanism provides a mechanical coupling between the focusing system of camera 10 and the aperture adjusting feature of exposure mechanism 66. A follow-focus type aperture setting is based upon an application of the inverse square law of light energy propagation wherein the light energy available from a given source is considered to vary inversely with the square of the distance from that source. Referring particularly to FIG. 3, when taking lens 64 is appropriately focused, an interceptor linkage, a portion of which is depicted at 218 is positioned such that when actuated, it will arrest the opening movement of blades 110 and 112 at a position defining a proper aperture value. Actuation of interceptor linkage 218 is carried out by a pull-down bar 220. Bar 220 is loosely hinged to a portion of exposure housing 16 at 222 and is connected to the internally disposed plunger of solenoid 214 at 224. As noted in FIG. 4, solenoid 214 is not energized until after the closure of exposure mechanism blades 110 and 112. When so energized, pull-down bar 220 is drawn inwardly by the plunger of solenoid 214 to position interceptor linkage 218 at a location engageable with a portion of walking beam 124 at such time as the beam is released for movement under the bias of spring 136. (See function block 194).

Upon release of exposure mechanism blades 110 and 112, as depicted at block 194, the flash control system provides a fixed delay, as functionally indicated at 228. Delay 228 serves to hold the next sequential operational event in abeyance until such time as walking beam 124 would have been capable of establishing a maximum available aperture width. Following time-out at delay 228, a flashlamp within assembly 210 is ignited, as depicted at function block 230. The resulting illumination is not monitored as described earlier in connection with function block 196, and a fixed delay is imposed having a duration selected to permit full utilization of the output of the flashlamp ignited at assembly 210. Following this fixed delay as shown at block 232, the photographic cycle continues as depicted at function block 200, with the closure of exposure mechanism blades 110 and 112 as well as with the carrying out of processing and cocking functions. The excitation winding of solenoid 214 is selectively de-energized following fixed delay 228, however, blades 110 and 112 are retained at an aperture defining position until such time as the excitation winding of solenoid 144 is re-energized to close blades 110 and 112.

Control Circuit

Referring to FIGS. 6, 7, and 8, a schematic diagram for a control circuit, along with related truth tables and energization state diagrams, serving to carry out the operational events discussed above are displayed. The circuit of the FIG. 6 includes a series of multi-function gates designated A–E, as well as more conventional AND GATES designated H and G and an OR GATE designated F. The inputs and outputs for these gates are depicted in Boolean enumeration in the truth tables, for instance, that shown in FIG. 7. For purposes for understanding the tabulations within these figures, as well as to facilitate the description to follow, when the inputs or outputs of the listed components are at ground reference potential, they are referred to as "low" and, additionally, such input or output is digitally identified as "0". Conversely, when these inputs and outputs assume or approach the voltage status of the power supply of the control circuit, they are referred to as being "high" and are given the binary designation "1". The operational events as tabulated and numbered in the truth tables are again identified by the same encircled numeration in corresponding energization state diagrams, for instance, as at FIG. 8. In these diagrams, the status of switches $S_1 - S_8$ of the circuit as well as the energization states of various components thereof are shown in comparative time scale fashion. It may be noted further that certain of the GATE input terminals receive common signals. These common signal terminals are identified by the letters $a$–$g$. Additionally, the outputs of GATES A–H are identified, respectively, by the letters $t_1$–$t_8$.

Control Circuit - Ambient Cycle

Looking to FIGS. 6, 7, and 8, the circuit arrangement for controlling camera 10 under ambient lighting conditions is illustrated. As noted earlier, a photographic cycle is commenced with the depression of start button 158. This depression serves to close a switch designated $S_1$ in the figure. Closure of switch $S_1$ connects a primary power line 240 which is connected with the positive terminal of a battery 238. The opposite terminal of battery 238 is connected by a line 242, through a closed switch $S_7$, to ground. Thus connected, primary power line 240 serves to energize a latching network depicted functionally by block 244. Described in detail and claimed in a copending application for U.S. Patent by J. P. Burgarella, P. P. Carcia, and R. C. Kee, Ser. No. 213,317 filed Dec. 27, 1972 and assigned in common herewith, network 244 operates under two energization states. The first of these states permits the operator of camera 10 to abort a photographic cycle until such time as switch $S_5$ is opened. Following the opening of switch $S_5$, a second energization state at network 244 permits a continuous powering of the circuit from line 245 even though the contacts of switch $S_1$ are separated.

The output of latching network 244 is present at a power distribution line 246 which, in turn, is connected to a branch power line 248. Branch power line 248 is connected to a second branch power line 250 and these two lines serve to power and assert initial control conditions over the various gates and components within the entire circuit.

These conditions, as they exist at the commencement of a photographic cycle, are tabulated at Event No. 1 in FIG. 7. As described in connection with function block 160 of FIG. 4, the initial operational event is that of energizing the excitation winding 252 of solenoid 144. This is carried out by asserting select input conditions to the input terminals of multifunction GATES A and B. Looking to these inputs, input terminals $a$, commonly connected by line 254, exhibit an initial low status by virtue of their connection along line 256 to the output of a trigger circuit 258. Trigger 258 may be of conventional design, for instance, a Schmitt-type having a normally conducting output stage and a normally non-conducting input stage. These stages operate to reverse their conductive states very rapidly upon receipt at the input stage of a signal which is at least equal to a predetermined triggering reference or threshhold level. Energized from branch power line 248 through line 260 and coupled to ground through line 262, the output at line 256 of trigger 258 remains low until a signal above the noted triggering reference level is received at any of its input lines, for instance, at line 266. Upon receipt of such signal, the output at line 256 assumes a high status. Such input, as derived at line 266, is developed from a control signal generated at an exposure control network designated generally at 268.

Gate input terminal $b$ of GATE A evidences a low state by virtue of its connection through line 270 and limiting resistor 272 to ground. Additionally, this low status is permitted as a result of the connection of line 270 through lines 274, 276, and 278 to switch $S_4$. As described earlier in connection with FIGS. 1 and 3, switch $S_4$ remains open until such time as exposure mechanism blades 110 and 112 are fully closed. At such time as switch $S_4$ is closed, line 278 is energized from primary power line 240.

Gate input terminal $c$ of GATE A is coupled through line 280 and line 282 to the corresponding common input terminal of GATE B. The initial low status of common terminals $c$ is derived as a result of the connection of line 282 through line 284 to the output 286 of a trigger 288. Similar to trigger 258, the output of trigger 288 is normally low and will assume a high status in response to the receipt of a signal above a predetermined triggering or threshhold value at its input 290.

Trigger 288 is energized from branch power line 250 through line 292 and is coupled to ground through lines 294 and 296. Representing the triggering component of the delay function described in connection with function block 170 of FIG. 4, trigger 288 serves to retain common input terminals $c$ at a low state during the pre-exposure phase of a photographic cycle. Note that this low input condition represents a signal from the electrical-mechanical interface of the control system that reflex component 50 has not been elevated to a position proximate that required for initiating the exposure phase of a photographic cycle.

With the assertion of the above described input logic, the resultant initial output, $t_1$ of GATE A, present at line 298, is high and is imposed at the base of an NPN transistor $Q_1$. The emitter of transistor $Q_1$ is coupled along line 300 to ground while its collector is connected to line 302. Line 302, in turn, connects the excitation winding 252 of solenoid 144 to primary power line 240. Solenoid 144 is designated functionally in FIG. 6 by a dashed boundary. The high status at line 298 serves to forward bias the base-emitter junction of transistor $Q_1$, thereby energizing winding 252 to cause exposure mechanism 66 to block the optical path of camera 10, as described in connection with function block 160 of FIG. 4. The output $t_2$ of GATE B is low at the commencement of a photographic cycle and is coupled through a current limiting resistor 304 and line 306 to line 302. GATE B serves a powering down function wherein solenoid 144 is energized at a lower current level when the plunger thereof gains its fully retracted position. To carry this out, GATE B diverts solenoid energizing current through limiting resistor 304. When transistor $Q_1$ is forward biased, however, this diversion through resistor 304 is insignificant. The powering down feature of the control system is described and claimed in a copending application for U.S. Patent by C. H. Biber and E. K. Shenk entitled, "Photographic Apparatus With Solenoid Powered Instrumentalities", Ser. No. 163,948, filed July 19, 1971 and assigned in common herewith.

Solenoid 144 being energized, blades 110 and 112 are driven to their fully closed position and when this position is reached, contacts 162 and 164 of transducer switch $S_4$ are closed. As a consequence, the control circuit reacts to this switch condition information that the exposure mechanism 66 is functioning properly and that sufficient power is available to fully close blades 110 and 112. As noted at Event No. 2 of FIG. 7, the closure of switch $S_4$ alters the $b$ input terminal state at line 270 from a low to a high, thus, the output at $t$ becomes low. This input terminal alteration changes output $t_1$ of GATE A to a low status, thereby removing the forward bias at transistor $Q_1$. The above-described power-down function performed by GATE B continues the energization of winding 252 at a selectively lower current level. The $b$ input terminal alteration also changes the output $t_3$ of GATE C. While Event No. 1 is being carried out, the output $t_3$ at line 308 of GATE C is high. This high output is established as a result of a low present at line 310 and introduced to input terminal $a$. Line 310 is coupled to line 254, the latter line providing a common coupling of the corresponding inputs of GATES A and B. Gate input terminal $d$ of GATE C remains low in consequence of its connection through lines 312, 314 and closed switch $S_5$ to ground. As cataloged at Event No. 2 of FIG. 7, inasmuch as input terminal $b$ of GATE C is coupled to switch $S_4$ in line 278 from line 276, the closure of switch $S_4$ alters its status from a low to a high state. The resultant low output $t_3$ of GATE C, when introduced through line 308, signals a motor control function 316 to energize motor 70. Control function 316 is energized from primary power line 240 through line 318 and is coupled to ground through line 320.

As discussed in connection with function block 170 of FIG. 4, the resultant energization of motor 70 effects the release or unlatching of reflex component 50, thereby enabling a spring drive mechanism to move it away from its viewing position. At the commencement of this movement, when component 50 remains closely proximate its viewing position, tab 172 of ram 80, moving in corresponding synchronism with reflex component 50, releases from engagement with insulated cap 174 of leaf 176 to open switch $S_5$. This electrical-mechanical interface activity signals the control system of camera 10 that the exposure plane is unblocked and that reflex component 50 is moving.

As disclosed as Event No. 3 in FIGS. 7 and 8, the opening of switch $S_5$ alters the status of input terminal $d$ of GATE C to a high condition and the resultant output $t_3$ of the gate becomes high. A high status at line 308 serves to signal motor control function 316 to de-energize motor 70. As a consequence, drive to gear train 72 is halted.

The opening of switch $S_5$ and resultant alteration of the status of input terminal $d$ serves to signal latching network 244 to assume its second energization state, thereby committing the control system to the completion of a photographic cycle. Connection between input line 312 and network 244 is made through resistor 322, line 324 and line 326.

As reflex component 50 approaches a location proximate its seated exposure position, ram 80, acting through tab 172, contacts insulative cap 182 to open switch $S_3$. Represented as Event No. 4 of FIGS. 6 and 7, the opening of switch $S_3$ serves to activate an R-C timing network identified generally at 330. This network serves to impose the delay described in connection with function block 190 in FIG. 4.

Formed of a timing resistor 332 and a timing capacitor 334 coupled within line 336 between line 296, ground and branch power line 250, network 330 serves to delay the commencement of the exposure phase of a photographic cycle. As described in connection with FIG. 9, this delay is selected in accordance with a time constant sufficient to permit reflex component 50 to fully seat at its exposure position. Switch $S_3$ also serves at the electrical-mechanical interface of the control system, signalling the control circuit that reflex component 50 has substantially reached its exposure position as a condition for continuing with the photographic cycle.

Network 330 is activated upon removal of a shunt about capacitor 334 which is constituted by a line 338, connected from a point intermediate capacitor 334 and resistor 332, to ground through a diode 340 and switch $S_3$. Diode 340 serves to isolate line 338 from spurious signals and the like.

Following the time-out of network 330, a threshold signal is developed at input 290 of trigger 288. As a consequence, trigger 288 alters its output at line 286 to a high status. This high status is introduced from line 284 to lines 280 and 282 to simultaneously alter the state of all common gate inputs $c$ to a high or 1 status. Such alteration changes the output $t_2$ of GATE B to a high state, thereby abruptly terminating current flow in line 302 with the consequence of de-energizing excitation winding 252 of solenoid 144. As described in connection with function block 194 of FIG. 4, the exposure phase of a photographic cycle begins as blades 110 and 112 of exposure mechanism 66 commence to open under the bias of spring 136. As blades 110 and 112 move from their blocking terminal position, switch $S_4$ again opens. As is catalogued in FIG. 7 at Event No. 5, the opening of switch $S_4$ inserts information into the circuit that blades 110 and 112 are in the course of opening, the information being present as an alteration in the state of common gate input $b$ from a high to a low.

In addition to effecting the de-energization of excitation winding 252, the signal change in line 282 also is introduced through an inverter 342 to activate an electronic switch shown generally at 344. Described in detail and claimed in a copending application for U.S. Patent by E. K. Shenk, Ser. No. 213,289, entitled "Exposure Control System Incorporating Solid State Switching To Enable a Light Sensitive Network", filed Dec. 29, 1971 and assigned in common herewith, when triggered, switch 344 removes a shunt established by lines 346 and 348 across a timing capacitor 350. The removal of this shunt activates exposure control network 268, thereby providing the light-responsive regulation function described in connection with block 196 of FIG. 4 and identified as Event No. 5 in FIGS. 7 and 8.

Network 268 includes a photovoltaic cell 352, positioned within camera 10 behind openings 118 and 120 of exposure mechanism 66, and connected to the input of an operational, differential type amplifier 354 by lines 356 and 358. Timing capacitor 350 is coupled within a feedback path between output 360 of amplifier 354 and its input at line 356.

Described in greater detail in a U.S. Patent by J. P. Burgarella, entitled "Automatic Exposure Control System With Fast Linear Response", No. 3,620,143, the output of this light sensing arrangement at line 360 represents an integrated valuation of scene lighting as witnessed at the optical path of camera 10. This output is varied in accordance with the sensitometric properties of film being exposed by a second amplification stage 362. Amplification stage 362 operates in conjunction with a gain adjusting variable resistor 364 and a calibrating resistor 366, the latter being positioned within a feedback path line 368. The noted film speed and calibration adjustment of the output at 360 is described in greater detail and claimed in U.S. Pat. No. 3,641,891. Power supplies for both amplifier 354 and 362 are provided from branch power line 248 and line 370, while ground connections for the amplifiers, respectively, are provided through lines 372 and 374.

The adjusted output from network 268 is presented along line 266 to trigger 258. When the signal value at line 266 reaches the threshold level of trigger 258, the output thereof at line 256 converts from a low to a high state. This conversion is represented in FIGS. 7 and 8 as operational Event No. 6. As displayed in those figures, the resultant high output at line 256 alters the status of common gate input terminals $a$ to a corresponding high status. The resultant outputs of GATES A and B are inverted. For instance, output $t_1$ of GATE A is changed to a high status and output $t_2$ of GATE B is changed to a low status. A high output at line 298 serves to forward bias the base-emitter junction of transistor $Q_1$, thereby energizing solenoid winding 252 from line 302, in turn, causing solenoid 144 to block the optical path of camera 10 by closing blades 110 and 112. As described in connection with function block 200 of FIG. 4, this action terminates the exposure phase of a photographic cycle and the full closure of blades 110 and 112 is witnessed and monitored by transducer switch $S_4$.

As switch $S_4$ is closed to commence the post-exposure phase of the photographic cycle, the status of input terminals $b$ at GATES A and C converts from a low to a high state. As in the earlier energization of solenoid 144, the alteration of input gate $b$ changes output $t_1$ of GATE A to a low status, thereby removing the forward bias at transistor $Q_1$. The earlier-described power-down function performed by GATE B continues the energization of wiinding 252 at a lower current level. As tabulated and displayed at Event No. 7 in FIGS. 7 and 8, the latter input alteration changes the output $t_3$ of GATE C to a low status, thereby activating motor control function 316 to, in turn, energize motor 70. As discussed earlier in connection with function blocks 202 and 204 of FIG. 4, when thus energized, motor 70 rotates cycle phase cam 76 to drive ram 80 rearwardly, thereby cocking or returning reflex component 50 to its viewing position. Of particular note, during the post-exposure phase, the output of trigger 258 at line 256 remains low and will be seen to serve as a controlling logic input requiring the completion of the final phase of the photographic cycle. Note in this regard, that common gate input $a$ of GATES A, B and C has reverted to a high state. The firing of trigger 258 was discussed earlier in connection with function block 198 of FIG. 4.

As ram 80 is driven rearwardly in the course of the post-exposure phase of the photographic cycle, pick assembly 92 is actuated to draw a photographic unit 34 from cassette 32 and move its forward edge into the bite of rotating processing rolls 86 and 88 to process the unit and/or drive it out of the receiving chamber of camera 10.

During the cocking of reflex component 50 from its exposure position, as it passes a location proximate its seated position, switch $S_3$ is again closed, thereby reactivating the shunt imposed by line 338 about timing capacitor 334. Trigger 288 returns to a low status to, in turn, change the state of common gate input terminals $c$ to a low status. (See Event No. 8 of FIG. 7). In effect, transducer switch $S_3$ has "tracked" reflex component 50 and has signalled the control circuit that the component 50 is in the process of returning to its viewing position.

When reflex component 50 moves to a location closely proximate its seated viewing position, tab 172 of ram 80 contacts insulative cap 174 of contact 76 of switch $S_5$ to urge leaf 176 into engagement with leaf 178. Displayed as Event No. 9 in FIGS. 7 and 8 and discussed in connection with function block 202 of FIG. 4, this switching action tracks component 50 and signals the control circuit that the exposure plane is again secured and that a photographic cycle may be concluded. More particularly, when switch $S_5$ is closed, the condition of gate input terminal $d$ alters from a high to a low status to, in turn, change the output $t_3$ at line 308 to a high status, thereby signalling motor control function 316 to stop motor 70.

When closed to terminate a photographic cycle, switch $S_5$ also imposes a quenching signal upon latching function 244 from along lines 314, 312, 324 and 326. As a consequence, the entire circuit is de-energized, thereby effecting the de-energization of excitation winding 252 of solenoid 144. The latter de-energization permits exposure mechanism blades 110 and 112 to be driven under the bias of spring 136 to their fully open position in preparation for a next succeeding phtotgraphic cycle.

Control Circuit - Flash Cycle

The control system of camera 10 converts to a follow-focus type flash operation when a flash source is mounted thereupon as described in connection with function block 214 of FIG. 4. When so mounted, a switch $S_2$ connected within line 324 is closed. Referring additionally to FIGS. 10 and 11, it may be seen that, at the commencement of a photographic cycle under flash operation, Event No. 1 remains the same as operation under ambient conditions. Accordingly, input conditions are imposed upon GATES A and B to effect the energization of excitation winding 252 of solenoid 144. As noted at function block 160 of FIG. 4, blades 110 and 112 of exposure mechanism 66 are driven to a blocking terminal position causing the closure of switch $S_4$. Again serving the noted transducer-monitor function, closure switch $S_4$ alters the state of the input terminals to GATE C to establish a low at output $t_3$, thereby causing motor control 316 to energize motor 70. Reflex component 50 is released, commences to elevate under spring drive and, as ram 80 moves to a position representing a location of component 50 which is closely proximate its viewing position, tab 172 releases from engagement with cap 174 of switch $S_5$. Switch $S_5$ opens. As in the case for ambient operation, when switch $S_5$ opens, latching network 244 assumes its second energization state, assuring the completion of a photographic cycle. The status of input terminal $d$ of GATE C converts to a high condition. As a consequence, the output $t_3$ of GATE C becomes high, serving to signal motor control function 316 to de-energize motor 70.

As shown at Event No. 3 of FIGS. 10 and 11, the opening of switch $S_5$ also prevents the assertion of a high signal from power distribution line 246 through line 324, closed switch $S_2$, line 376 and line 378 to common input terminal $e$ of GATES E and D. Line 324 is connected to power line 246 through a limiting resistor 380 and, through a level setting resistor 382 and switch $S_2$, to ground.

During a flash cycle, switch $S_5$ serves the additional function of activating the flash exposure system by effecting the energization of flash solenoid 214 as discussed in connection with block 216 at FIG. 4. This exposure control feature requires an assurance that blades 110 and 112 are fully closed. Accordingly, the slight delay following closure switch $S_4$, as is required to actuate switch $S_5$, provides this desirable design feature.

Prior to the opening of switch $S_5$, input terminals $e$ retain a low state, inasmuch as the high signal otherwise derived from power line 246 is diverted along line 312 and switch $S_5$. Common input terminals $a$ of GATES D and E remain low throughout the initial portions of a photographic cycle in consequence of their connection, respectively, from lines 384 and 386 to line 310. As described earlier, line 310 interconnects common input terminals $a$ of GATES A, B and C. Input terminal $f$ of GATE D remains low in consequence of its connection through lines 388, 390, diode 392 and a closed switch $S_3$ to ground. Line 390 is connected between branch power line 250 and ground and includes a current limiting resistor 394 above its connection with line 388 to permit the desired initial low status at input terminal $f$. Diode 392 serves to accommodate spurious signals or the like generated in operation of switch $S_3$.

Input terminal $g$ of GATE E retains an initial low status as a result of its connection along line 396 to the output stage of the trigger 400 of an R-C timing network shown generally 402. Trigger 400 may be of a Schmitt variety, having a normally non-conducting input stage operating in conjunction with a normally conducting output stage. These stages rapidly reverse their conductive states upon receipt of a threshold level signal at the input stage. Network 402 will be seen to serve the function described in connection with block 228 of FIG. 4.

Under the input conditions thus described, GATE D forms a low output state $t_4$ at output line 406 and GATE E develops a high output $t_5$ at line 408. Output line 406 is connected with the base of an NPN transistor $Q_2$. The emitter of transistor $Q_2$ is connected through line 410 to ground, while its collector is coupled through lines 412 and 414 through the excitation winding 416 of solenoid 214 to primary power line 240. Solenoid 214 is represented in FIG. 6 as a dashed boundary. Output line 408 of GATE E is connected, through a current limiting resistor 418 present in line 412, to line 414. Under the output conditions described above, the low state of output $t_4$ serves to prevent the forward biasing of transistor $Q_2$, thereby isolating line 414 from ground. Similarly, the high status of output $t_5$ also prevents current passage through line 414. Accordingly, the excitation winding 416 of solenoid 214 remains inactive pending the opening of switch $S_5$.

As noted at Event No. 3 in FIG. 10, when switch the 5 opens, a high signal is imposed along lines 376 and 378 to common input terminals $e$ of GATES E and D. As a result, output $t_4$ of GATE D becomes high, thereby forward biasing transistor $Q_2$ to permit current flow through line 414 and effect energization of excitation winding 416. Output $t_5$ of GATE E converts to a low state, also permitting current flow through line 414. However, as a result of the presence of current limiting resistor 418, the value of such current is dismissible. The energization of solenoid 214, as described in connection with function block 216 of FIG. 4, provides for th positioning of interceptor linkage 218 at a location establishing a focus-responsive aperture opening.

As reflex component 50 moves across a location proximate its seated exposure position, ram 80 opens switch $S_3$, thereby activating R-C delay network 330 by deactivating shunt line 338. Delay network 330 functions identically for both flash operation and ambient operation, as described in connection with function block 190 of FIG. 4. However, as noted at Event No. 4 of FIG. 10, transducer switch $S_3$ now performs a second electrical-mechanical innerface function of asserting power-down conditions upon the winding 416 of solenoid 214. As switch $S_3$ is opened, a high signal is imposed from lines 390 and 388 into input terminal $f$ of GATE D. The resultant input alteration changes output $t_4$ from a high to a low state. As a consequence, the forward bias at transistor $Q_2$ is removed and energizing current for excitation winding 416 of solenoid 214 is diverted through a path including current limiting resistor 418 and output line 408 of GATE E. Winding 416 is energized at a lower current level so as to conserve energy available from battery 238.

When delay network 330 attains the requisite threshold level of trigger 288, the output thereof at line 286 converts from a low state to a high state. As shown at Event No. 5 in FIGS. 10 and 11 and, as described earlier in connection with the ambient cycle of camera 10, the low state at output 286 serves to initiate the exposure phase of the photographic cycle by converting common input terminals $c$ GATES A and B to a low state. This conversion, in turn, changes output $t_2$ of GATE B to a high state, thereby de-energizing excitation winding 252 of solenoid 144. Exposure mechanism blades 110 and 112 are released for movement toward their open terminal position as described in connection with function block 194 of FIG. 4.

The high signal at line 286 occasioned with the firing of trigger 288 also serves to initiate the fixed delay described in FIG. 4 in conjunction with function block 228 by activating network 402. This delay is selected in accordance with the amount of time required for blades 110 adn 112 to achieve their terminal open positions, however, the blades are captured at an appropriate focus responsive setting by interceptor link 218, in turn, actuated with the energization of winding 416 of solenoid 214. To activate network 402, the high output of trigger 288 at line 286 is converted to a low state by an inverter 420. From inverter 420, the low signal is introduced along line 422 to the base of an NPN transistor $Q_4$. The collector of transistor $Q_4$ is connected along line 424 to line 426 at a point representing a junction between timing resistor 428 and a timing capacitor 430. The opposite side of capacitor 430 is connected to line 432, in turn, coupled between the emitter of transistor $Q_4$ and line 434 extending in turn, from trigger 400 to ground. During the time-out of delay network 330, the high signal from invertor 420 at line 422 serves to forward bias the base-emitter junction of transistor $Q_4$, thereby imposing a shunt about capacitor 430. When trigger 288 fires, its inverted output at line 422 removes the forward bias at transistor $Q_4$ to remove the noted shunt and activate network 402. Trigger 400 is connected with branch power line 250 from along line 436.

As timing network 402 is activated, switch $S_4$ opens as blades 110 and 112 leave their blocking terminal position. This conversion of switch $S_4$ serves to change common input terminals $b$ from a high state to a low state as shown at Event No. 6 of FIGS. 10 and 11. Following the time-out of network 402, the output of trigger 400 alters from a low condition to a high state to, in turn, act through line 396 to alter the condition of input terminal $g$ of GATE E from a low to a high state. Represented as Event No. 7 in FIGS. 10 and 11, this change alters output $t_5$ from a low state, permitting the energization of excitation winding 416, to a high state de-energizing solenoid 214. With this de-energization, a signal is generated from winding 416 which is witnessed at line 408. Line 408 is connected to a flash logic function depicted generally by block 438.

Powered from line 240 from along line 440 and connected to ground through line 442, logic function 438 serves initially to inactivate exposure control network 268 by maintaining electronic switch 334 in a condition preventing removal of the earlier described shunt about timing capacitor 350. The signal providing for this inactivation is high and is inserted from along line 444. Flash logic function 438 additionally serves to ignite a select one of the flashbulbs within flash assembly 210 in accordance with function block 230 of FIG. 4. An electronic arrangement for providing a sequential flash firing system responsive to the noted signal generation is described in a copending application for U.S. Patent, Ser. No. 844,470 by J. P. Burgarella and S. Ellin, filed July 24, 1969, entitled "Flash Synchronization Circuit for Sequential Firing of an Array of Flashbulbs" and assigned in common herewith.

Logic function 438, acting along line 446, also provides the fixed delay described in connection with function block 232 in FIG. 4. This function inserts a threshold level signal to trigger 258 which converts the output thereof at line 256 to a low state, thereby causing the control system to progress through its post-exposure phase in identical fashion as carried out for an ambient cycle. As before, the output of trigger 258 provides primary regulation of the noted post-exposure phase.

The conclusion of the flash photographic cycle is depicted in connection with Event Nos. 8–11 of FIGS. 10 and 11 as well as in connection with function blocks 198, 200, 202, 204, and 206 of FIG. 4.

Ultra-Low Ambient Monitor

Attempts may be made to operate camera 10 under lighting conditions so low as to cause the control circuit thereof to be energized for a harmfully excessive period of time. Additionally, the camera might be stored in its erected state and inadvertently actuated in a darkened storage environment.

To cause camera 10 to complete a cycle under such conditions, a time delay function 448 is incorporated within the circuit. Function 448 has an input coupled to line 282 from along line 450 and an output at line 452 extending into the input of trigger 258. Inasmuch as function 448 is energized from line 282, it is actuated or brought into operation upon the firing of trigger 288, i.e. at commencement of the exposure phase. Following about a 20 second time-out, a signal is introduced from function 448 along line 452 into the input of trigger 258. This signal is of appropriate reference value to fire trigger 258 to establish a high output at line 256. As noted earlier, such a high output compels the circuit to enter into and complete a post-exposure phase of a photographic cycle.

Override Reset Cycle

At the introduction to the description of the circuit of FIG. 6, it was noted that for the control system of the camera to carry out a predetermined order or sequence of operational events, proper initial logic conditions need to be imposed at all of the components of the circuit. This requirement also obtains to assure proper operation of each of the three phases of any given photographic cycle. It is not improbable that, where a complex control system as is disclosed is used by the general public, inadvertent improper manipulation thereof may disrupt input or output gate logic at some intermediate point within a photographic cycle. For instance, should power be interrupted during the post-exposure phase, trigger 258 will reset such that its output reassumes a low state. Without the requisite high state during this post-exposure phase, camera 10 cannot complete a photographic cycle and some expertise would be required in resetting the system. Note in this regard that transducer switches $S_3$ and $S_5$ would be in orientations representative of a pre-exposure phase of a photographic cycle under such power interruption. Interruptions in such power can take place through inadvertent opening of interlock switches or by operating camera 10 under temperature conditions or the like inducing battery failure. When such an aborting of a photographic cycle occurs, the control system provides a self-contained technique for carrying out an appropriate resetting procedure. To assure the simplicity of this procedure, it is carried out by the simple operational steps of opening loading door 44, removing cassette 32, clearing any mechanism fouling occasioned from movement of a film unit as at 34, replacing cassette 32 and closing loading door 44. The mechanical switch logic associated with maneuvering cassette 32 in and out of the receiving chamber of camera 10 is effected through the use of a counter mechanism and an innerlock switching arrangement associated with loading door 44. To facilitate the description to follow, the operation of the circuit components in conjunction with such switching is initially described, following which the mechanism for actuating necessary switching is detailed.

Referring to FIG. 4, the operations adjusting the control system to operate in an override cycle are shown in block logic form. For instance, the removal and reinsertion of a cassette 32 into the receiving chamber of camera 10 is depicted at function block 454, while the procedure of closing and latching loading door 44 to secure the receiving chamber of camera 10 is depicted at function block 456. When steps 454 and 456 have been taken, a flash deactivation logic feature 458, serving to disable the flash firing capability of the camera 10, is activated.

Following closure and latching of the loading door 44 of camera 10 as shown at block 456, the control system automatically is started without recourse to depressing start button 158. The automatic start function is depicted at function block 460. As shown in FIG. 4, the control system then continues a normal pre-exposure phase as described earlier in connection with function blocks 160 and 170. However, prior to the activation of delay 190, the override cycle feature inserts a post-exposure logic as depicted at function block 462 and shown inserted by dashed line 464. When so inserted, post-exposure logic function 462 serves to substantially override the operational events described earlier in connection with function blocks 194, 196, 198, and, to a large extent, function 200. Accordingly, just prior to the time-out of delay 190, a post-exposure phase logic condition is imposed upon the control circuit of camera 10. This logic energizes motor 70 substantially continuously to re-establish necessary start orientations of all switches. The extent of the override performance of post-exposure logic 462, as it is associated with the exposure phase of a normal photographic cycle, is delineated by dashed boundary 466.

Override-Reset Cycle-Circuit

Referring to FIGS. 6, 12 and 13, the two switches serving to activate the override cycle are illustrated as $S_7$ within line 242 and $S_8$, situate within line 468 extending from line 470 to the input terminal $h$ of OR GATE F. Line 468 also is connected to latching network 244 through line 472.

To commence a reset cycle, both switches $S_7$ and $S_8$ are closed. Of these switches, switch $S_7$ serves interlock and start functions, while switch $S_8$, in effect operates in parallel with switch $S_1$. As these switches are closed, a signal is introduced from primary power line 240, through lines 470, 468, and 472 to latching network 244, to cause it to assume and retain its earlier described first energization state. Note that latching network 244 is activated by a signal from switch $S_8$ through line 472 in providing for maintenance of this first energization state. As described in connection with automatic start function block 460 of FIG. 4, switch $S_1$ need not be closed to initiate the reset cycle.

Seen catalogued at Event No. 1 of FIG. 12, the high signal introduced from line 240 through line 468 and switch $S_8$ imposes a corresponding high at input $h$ of GATE F to derive, in turn, a high output $t_6$ at line 474. Line 474 is connected through line 476 to the base of an NPN transistor $Q_3$. Th emitter of transistor $Q_3$ is coupled to ground through line 478, while its collector is coupled through line 480 to line 324 as it extends from switch $S_2$ to resistor 382. With the arrangement shown, when power is supplied to primary power line 240 from battery 238 and switch $S_8$ is closed, a high signal is imposed from GATE F across the base-emitter junction of transistor $Q_3$ to render it forwardly biased. When so forwardly biased, transistor $Q_3$ isolates the function of switch $S_2$ by drawing line 376 to ground reference. As a consequence, the output $t_4$ of GATE D remains low and the output $t_5$ of GATE E remains high and the winding 416 of solenoid 214 remains disabled throughout a reset cycle.

This feature of the control system is functionally indicated at block 458 of FIG. 4. With the arrangement, a flashlamp within array 210 cannot be fired inadvertently should the array remain mounted upon camera 10 during a reset cycle. The association between flash deactivation block 458 and the function 216 of energizing flash solenoid 214 is represented by line 482 in FIG. 4.

The activation of latching function 244 also imposes initial requisite conditions upon the outputs $t_1$ through $t_3$ of respective GATES A through C to provide for the commencement of the pre-exposure phase of a photographic cycle identical to that obtained in ambient operation. Accordingly, as shown at function block 160 of FIG. 4, exposure mechanism blades 110 and 112 are driven to a closed position by solenoid 144 and exposure chamber 28 is secured.

Additionally during this pre-exposure phase, input terminal $h$ of GATE H assumes a high status by virtue of its connection with energized line 468 through line 472. Input terminal $b$ of GATE H is held at a low state as a consequence of its connection from line 484 to common gate connecting lines 274 and 276. Input terminal $d$ of GATE H is held at a low status as a consequence of its connection along line 486 to lines 312, 314, and closed switch $S_5$ to ground. GATE H is an AND GATE and, with the noted input conditions, its corresponding output $t_8$ at line 488 is held in a low condition. Line 488 is connected through a diode 490 and line 492 to the input of trigger 258. It follows, that when the output $t_8$ alters to a high status, a threshold signal is inserted into the input of trigger 258 to alter its corresponding output from a low to a high state.

As set forth as Event No. 2 in FIGS. 12 and 13, when exposure mechanism blades 110 and 112 reach a closed terminal position, output $t_1$ of GATE A is changed from a high state to a low state as a result of the alteration of common input terminal $b$ from a low state to a high state. Winding 252 of solenoid 144 now retains plunger 148 in its retracted position utilizing a diminished current value as established by limiting resistor 304, coupled with the output of GATE B. Alteration of common gate input $b$ also is witnessed at GATE H from line 484, as it is coupled with lines 276 and 278. While the output $t_8$ of GATE H is not altered, that of GATE C at line 308 is changed from a high to a low state. As a consequence, motor control 316 turns on motor 70.

As described in connection with function block 170 of FIG. 4, a resultant driving of gear train 72 effects the release of reflex component 50 for movement toward its exposure position and its initial movement serves to open switch $S_5$. When switch $S_5$ is opened, the input and output states catalogued at Event No. 3 in FIG. 12 are obtained. For instance, input terminal $d$ of GATE C not only is altered from a low to a high state, but also the corresponding input terminal $d$ of GATE H is so altered. The latter change at the input of GATE H changes its output $t_8$ at line 488 from a low to a high. This high signal is impressed through diode 490 and line 492 to the input of trigger 258. As a consequence, trigger 258 signals both GATES A and B from both lines 254 and 256 to energize excitation winding 252 of solenoid 144. In effect, the control system has operated under a "zero" exposure condition, i.e., the sequence of operational events now includes the insertion of post-exposure phase logic as described in connection with function block 462 and line 466 of FIG. 4. The command at common gate input $d$ of GATE C is overridden by the command of trigger 258 to terminate an exposure. For instance, as shown at Event No. 4 of FIG. 12, GATE C receives a high status command at common input terminal $a$ to cause motor control 316 to continue energization of motor 70.

As reflex component 50 continues to rise under spring drive, switch $S_3$ is opened, as noted at Event No. 5 of FIG. 12. Timing network 330 commences to impose the delay described in connection with function block 190 of FIG. 4. When trigger 288 is tripped at the termination of the noted delay, output line 286 assumes a low state, however, the resultant imposition of this signal at common gate inputs $c$ of GATES A and B does not alter the status of outputs $t_1$ and $t_2$. Excitation winding 252 of solenoid 144 remains energized and the optical path of camera 10 remains blocked.

Even though motor 70 is operated as reflex component 50 is being driven upward toward its exposure position, the component 50 will continue to move until it substantially reaches its seated exposure location. However, by virtue of the energization of motor 70, component 50 is immediately driven to its initial viewing position. During the latter actuation, as noted at Event No. 6 of FIG. 12, switch $S_3$ is closed or reset. As in the case of ambient performance, the closure of switch $S_3$ during cocking procedures has no effect upon shutter controlling GATES A or B or upon motor controlling GATE C. Accordingly, blades 110 and 112 remain closed and motor 70 continues to run.

As reflex component 50 approaches its seated, viewing position, the counter mechanism of camera 10 opens switch $S_8$ as depicted at Event No. 7 in FIGS. 12 and 13. However, inasmuch as latching network 244 is responsive to the condition of switch $S_5$ for energization, the circuit remains energized. As switch $S_8$ opens, input terminal $h$ of GATE H alters from a high state to a low state. In consequence, output $t_8$ at lines 488 and 492 changes to a low state. However, since trigger 258 is configured to retain its triggered status until de-energized at the completion of a photographic cycle, no alteration is made to the outputs $t_1$ and $t_2$ of GATES A and B.

As reflex component 50 reaches a location closely proximate its viewing position, tab 172 of ram 80 closes and resets switch $S_5$, as noted at Event No. 8 of FIGS. 12 and 13. Closure of switch $S_5$ functions, as described in connection with ambient performance of the system, to quench or close down the circuit and terminate a reset cycle. With the noted de-energization, winding 252 of solenoid 144 is de-energized, thereby permitting blades 110 and 112 of exposure mechanism 66 to assume their fully open positions. Camera 10 now has been reset and the circuit thereof realigned such that it may operate in proper fashion throughout a next succeeding photographic cycle.

An interesting feature of the override cycle resides in the provision of a "lost motion" connection between ram 80 and reflex component 50 (described in the above-referenced application for U.S. Pat. Ser. No. 134,733). Should component 50 stick in an upward position, the spring-type "lost motion" connection permits full recycling by movement of ram 80. Once such interference is eliminated, component 50 merely is spring driven to its viewing position; no re-energization of the circuit being required.

Override Cycle-Counter

In the event of a photographic cycle failure, the operator of camera 10 is instructed to open loading door 44, remove the cassette 32 therefrom and examine the receiving chamber for possible mechanical interference or the like. The operator is then instructed to replace cassette 32 within the receiving chamber and close loading door 44. With this activity, camera 10 automatically recycles, the control circuit thereof performing as described immediately above. Switches $S_7$ and $S_8$, representing the actuating means for this reset correction, are operated in conjunction with the above catalogued procedure. One of these switches, $S_8$, is positioned within a rear corner of base 18 and is actuated in conjunction with the operation of counter mechanism shown in FIGS. 14 and 19.

Described in a copending application for U. S. Pat. by R. D. Leduc, Ser. No. 102,435, entitled "Exposure Counter For Single-Lens Reflex Camera" filed Dec. 29, 1970 and assigned in common herewith, the counter is shown generally at 494. Counter 494 includes a compound ratchet wheel 496, the outer periphery of which supports printed indicia indicating the number of exposures used up in camera 10, as well as a status wherein no cassette 32 is properly present within the noted receiving chamber or that the cassette is empty. The status evidencing a fresh replacement of a cassette 32 or no cassette 32 is represented by the letters "DS".

Mounted upon a supporting bracket 498 secured to the inner frame 30, wheel 496 additionally is formed having drive and release ratchets shown, respectively, at 500 and 502. Release ratchet 502 is configured for operation in conjunction with a no-back pawl 504 which is biased by a spring 506 (FIG. 19) such that its tip portion 508 is urged into engagement with succeeding teeth of ratchet 502. Drive ratchet 500 is configured for operation in conjunction with a drive pawl 510 which is pivotally attached at axle 512 to the rearward edge of reflex component 50. Drive pawl 510 is biased by a spring 514 to insure positive engagement with succeeding ones of the teeth of drive ratchet 500 when reflex component 50 is driven from its exposure position into its viewing position during a reset or cocking procedure. Pawl 510 also includes a cylindrical tab 516 and a tooth engaging tip portion 518.

With the above combination of components, as reflex component 50 is driven downwardly, tip 518 of pawl 510 engages a tooth of drive ratchet 500, thereby rotating wheel 496 in a clockwise direction as viewed in the sense of the figures. During this rotation, the spirally wound spring 520, having one end coupled with wheel 496 and the other with bracket 498, is incrementally wound. When reflex component 50 closely approaches its viewing position, the tip 508 of no-back pawl 504 engages an appropriate one of the teeth of release ratchet 502 to hold wheel 496 in position against the bias imparted from spring 520. Following cocking procedures, an appropriate indicia on the face of wheel 496 can be viewed through a transparent window 522 formed in the rearward surface of base 18.

Counter mechanism 494 also includes a reset pawl 524 mounted copivotally with no-back pawl 504 upon an axle 526 supported from bracket 498. Reset pawl 524 is formed having a drive pawl release stem 528 extending upwardly in position for selective engagement with cylindrical tab 516 of drive pawl 510. Pawl 524 also is formed incorporating an actuator arm 530 extending forwardly from its connection with axle 526 and a drive flange 532 extending from arm 530 in a manner wherein it is selectively contactable with an extension 534 of no-back pawl 504. Actuator arm 530 is slotted at 536 in a manner permitting it to receive the tip of a sensing member present as a spring 538 the stationary end of which is fixed to the bottom of base 18.

Figure 19:
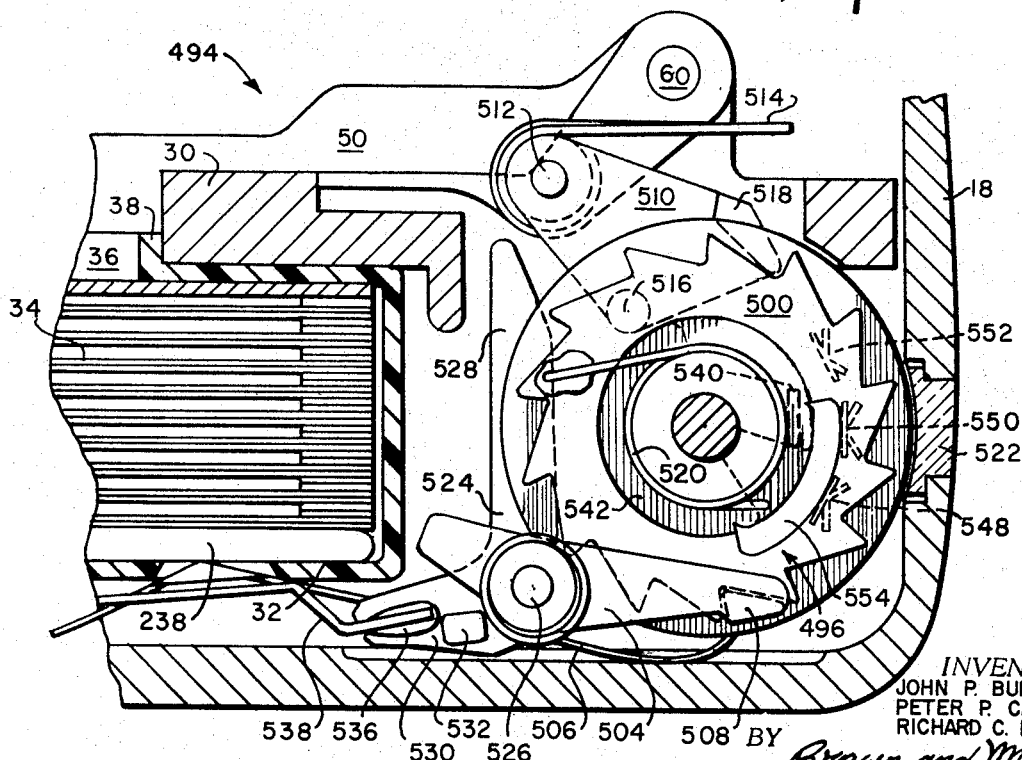
FIG. 19 is a partial, side sectional view of the counter mechanism of FIG. 14 showing the orientations of components thereof when the film supply of the camera is exhausted.

As evidenced in FIG. 19, when a cassette 32 is properly positioned within the receiving chamber of camera 10, spring 538, which is biased for movement upwardly, is moved toward the bottom of base 18. This movement is transferred through actuator arm 530 to orient reset pawl 524 in a position wherein flange 532 does not contact extension 534 of no-back pawl 504 and wherein stem 528 does not contact tab 516 of drive pawl 510.

When cassette 32 is removed from the receiving chamber of camera 10, spring 538 elevates, thereby pivoting reset pawl 524 about axle 526. Thus pivoted, stem 528 contacts cylindrical tab 516 of drive pawl 510 to rotate tip portion 518 thereof out of engagment with the teeth of drive ratchet 500. Simultaneously, drive flange 532 contacts extension 534 of no-back pawl 504 to drive tip 508 of the latter out of engagement with the teeth of release ratchet 502. As a consequence, wheel 496 is rotated in a counterclockwise direction under the bias of spring 520 until a stop member 540 extending within an annular opening 542 in drive ratchet 500 contacts a striking surface 544 formed within an annular opening 542 in drive rachet 500. When contact is made between stop member 540 and surface 544, wheel 496 is halted at an orientation wherein the indicia DS appears at window 522. This orientation is depicted in FIG. 19.

Switch $S_8$ is formed within an assembly including an insulative base 546 supported from an outboard portion of bracket 498. Base 546 supports three resilient switch leaves 548, 550 and 552. The outer tips of these leaves are formed to provide wiper surfaces which are arranged for slideable engagement with the cylindrical surface of a commutator 554 mounted upon wheel 496 outwardly of release ratchet 502. Common switch leaf 550 and leaf 548 combine to form switch $S_8$. Commutator 554 is configured of such length and of such orientation with respect to wheel 496 as to electrically join these leaves of switch $S_8$ only at such time as wheel 496 has been released by reset pawl 524 for movement under the bias of spring 520 into a position wherein stop member 540 contacts striking surface 544. This position represents one wherein a cassette 32 has been removed from the receiving chamber of camera 10. The orientation remains upon reinsertion of the cassette 32 and is altered to a next succeeding numerical position only after the automatic actuation of an override cycle attendant with the closure of switch $S_8$. The disconnection of switch $S_8$ leaf 548 from common leaf 550 has been described earlier in connection with the control system circuit in conjunction with Event No. 7 of FIG. 12. Additionally, the function of switch $S_8$ in combination with counter 494 has been discussed in connection with function block 454 of FIG. 4.

Override Cycle - Loading Door Switching

The second switch, $S_7$, operating within the override cycle performs in conjunction with loading door 44.

Figure 16:
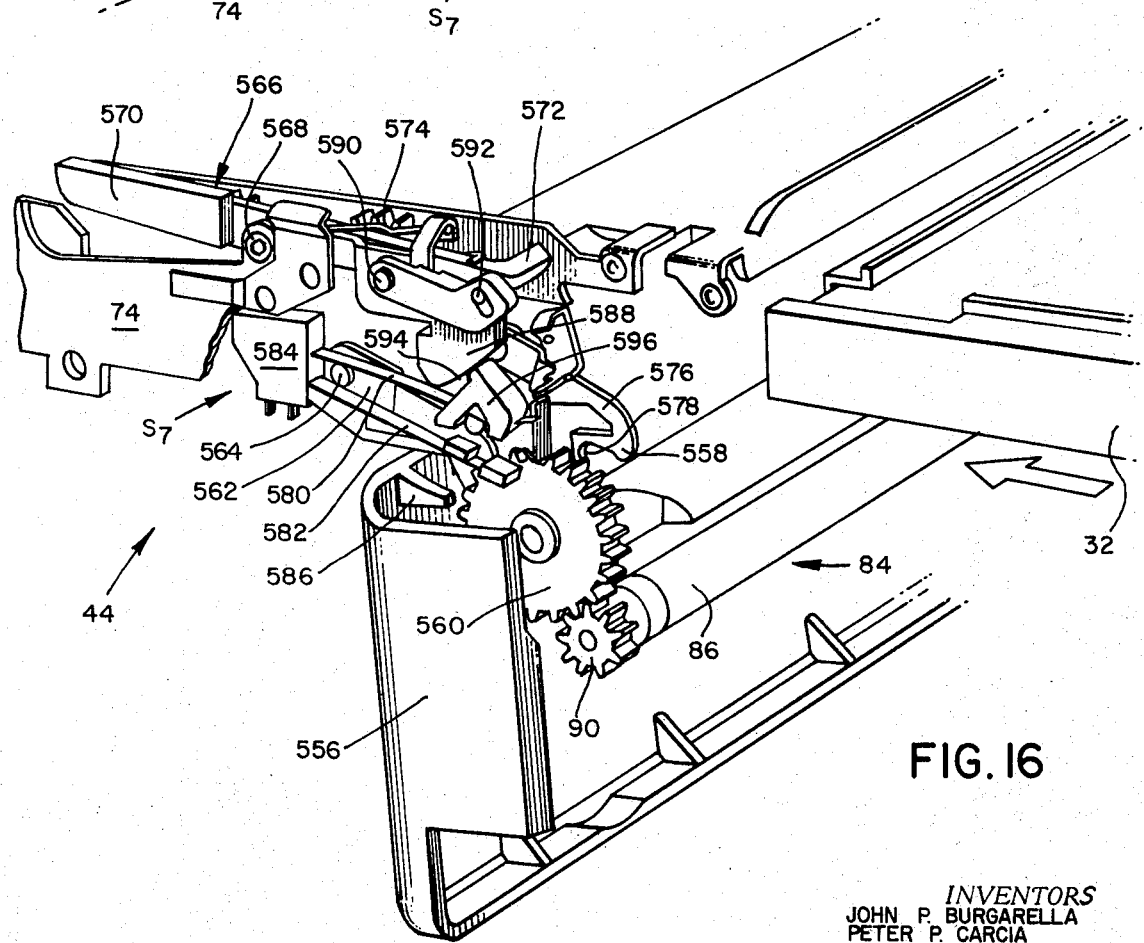
FIG. 16 is a partial perspective view of a forward portion of the camera of FIG. 1, showing a loading access door in an open position, the view having portions broken away to reveal internal structure.

Referring to FIGS. 15 and 16, the forward portion of camera 10 is revealed in enhanced detail. Loading access door 44 includes an outer cover 556 which is attached at its inner side to the lowermost portion of a hinge bracket 558. The forward portion of bracket 558 supports processing station 84 components, roll 86 thereof being visible in the figures, along with drive pinion 90 and a spur gear 560. The rearward extension of bracket 558 is configured as a hinge arm 562 which is pivotally coupled to inner frame 30 at a hinge pin 564 fixed to and extending therefrom. Thus pivotally connected to inner frame 30, loading door 44 can be manipulated manually from the closed or securing position, shown in FIG. 15, to the opened position, shown in FIG. 16, which provides access for directly inserting and removing a cassette 32 in the general direction shown by the arrow.

When in the closed position of FIG. 15, loading door 44 is locked by manually actuated latch 566. Latch 566 is pivotally mounted upon an axle 568 extending between inner frame 30 and outer plate 74. The latch is formed having a finger engageable extension 570 positioned on one side of axle 568 and a latching tip 572 formed oppositely therefrom. A spring, a portion of which is shown at 574, is connected between latch 566 and outer plate 74 in a manner biasing latching tip 572 in a downward direction.

Latching tip 572 is configured to slidably engage with the cam surface of a latching extension 576 of hinge bracket 558. For instance, as loading door 44 is pivoted about hinge pin 564 toward the latched position of FIG. 15, latching tip 572 engages the cam surface of extension 576 and gradually is elevated until such time as it is driven downwardly by spring 574 to engage within a latching recess 578 formed within extension 576. In that position, as shown in FIG. 15, loading door 44 is in a locked position.

Switch $S_7$ operates in conjunction with the movement of loading door 44 to and from the noted locked position. The switch is configured having two resilient leaves 580 and 582 which extend from and are supported by an insulative base 584 fixed to outer plate 74.

As is described in detail and claimed in a copending application for U.S. Pat. by R. Paglia, Ser. No. 213,316, entitled "Photographic Apparatus With Delayed Interlock Switch", filed Dec. 29, 1971 and assigned in common herewith, switches $S_7$ is actuated such that the contacts of leaves 580 and 582 are electrically joined only after loading door 44 is locked in its closed position. In this regard, outer cover 556 is formed incorporating a camming stud 586 which is configured and positioned to selectively engage lower leaf 582 as loading door 44 is moved toward its locked position. As door 44 reaches this position, stud 586 will have positioned leaf 582 at a predetermned point of contact.

Similarly, as door 44 is moved toward its locked position, the cam surface of latching extension 576 engages tip 572 to drive it upwardly substantially throughout the entire closing movement of door 44. As tip 572 is driven upwardly, a switching cam 588, pivotally connected at 590 to outer plate 74 and to latch 566 at 592, is rotated in a counterclockwise direction in the sense of FIGS. 15 and 16. This rotation moves a cam surface 594, formed within switching cam 588, across the contacting tip of an insulative follower 596. Follower 596 is fixed to the outer edge of switch leaf 582. As loading door 44 reaches its locked position, cam surface 594 moves across follower 596 to cause leaf 580 to elevate. When latching tip 572 of latch 566 is driven into latching recess 578 of hinge bracket 558, rotation of switching cam 588 is reversed to drive follower 596 and upper leaf 580 into switching contact with lower leaf 582. When the contacts of switch $S_7$ are thus made, as described earlier in connection with block 456 of FIG. 4, the automatic start function for the control circuit, as described in conjunction with function block 460, is activated and an override cycle ensues.

Override Cycle - Empty Cassette

It is not improbable that an operator of camera 10 inadvertently may attempt to take a photograph when the film supply of cassette 32 is exhausted. In the event of such occurrence, it is desirable that no flashlamp with array 210 be wasted. In other circumstances in the "light" of the flashlamp, it is desirable that camera 10 be actuable to operate through test cycles without the presence of a film supply. Inasmuch as the power supply of the camera is present as battery 238 located at the bottom of each cassette 32 (see FIG. 19), a cassette empty of film units but containing a battery or substitute must be positioned with camera 10 to effect a test cycle. So as to observe an opening and closing of blades 110 and 112 during such test cycle, it further is desirable to provide a fixed exposure interval permitting blades 110 and 112 to be exercised to their full extent, i.e. from one terminal position to another.

Referring again to FIG. 4, the empty cassette logic for the override cycle of camera 10 is displayed in block logic form. When an empty cassette is present within the receiving chamber of camera 10, this logic is established as set forth at block 598. When so established, the empty cassette logic imposes a signal as along line 600 to the flash de-activation logic described earlier and in connection with function block 458 and line 482. To permit test cycling, no automatic start is present in the empty cassette override cycle and the operator commences a test cycle with the depression of start button 158. With such start-up, exposure mechanism blades 110 and 112 are closed as set forth at block 160, reflex component 50 is released, as shown at block 170, and delay network 330 is activated, as described in connection with block 190. At this juncture in the test cycle, however, as noted at line 602, the fixed delay described in conjunction with the flash cycle of the operation of the camera at block 228 is activated. This delay has a time constant selected to permit blades 110 and 112 to open to their full extent. As they achieve this fully opened terminal position, a signal is imposed from fixed delay 228, as indicated along line 604, to post-exposure logic 462. With the latter signal, post-exposure logic 462 causes the control system to commence the post-exposure phase of a photographic cycle to conclude the test cycle.

Figure 14:
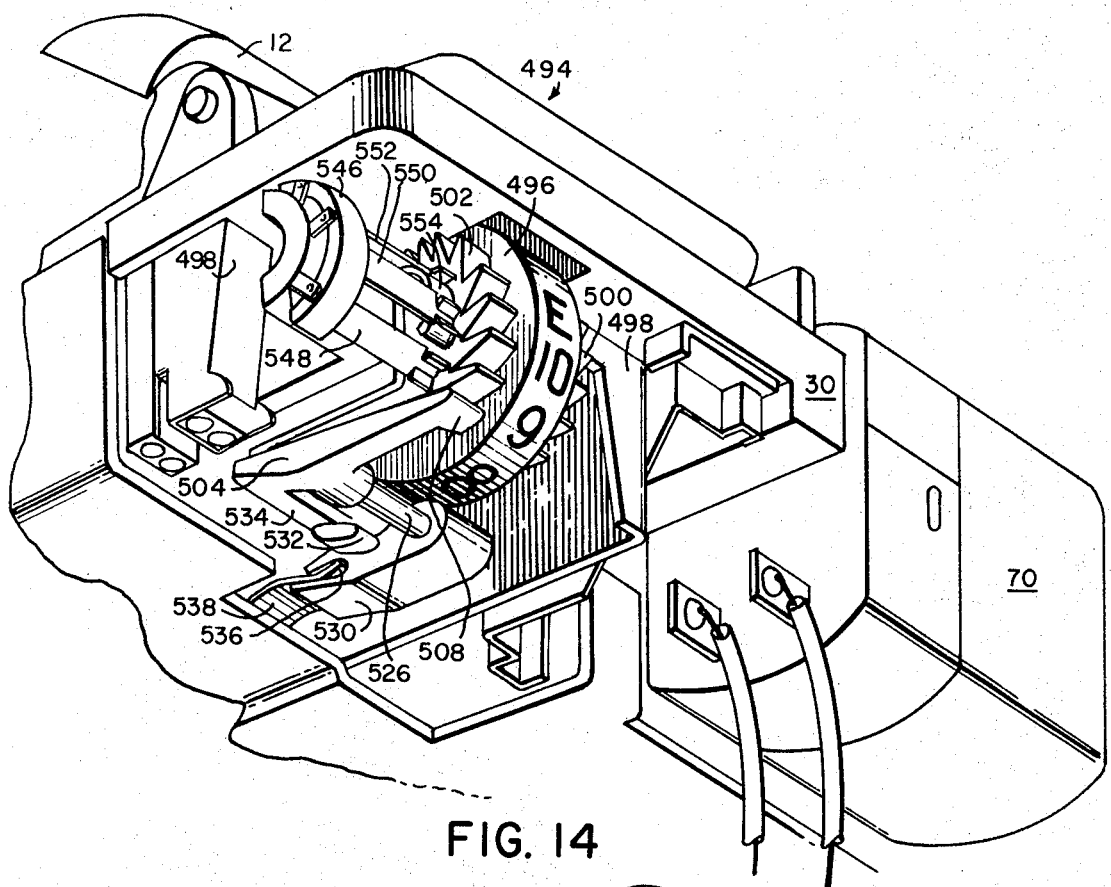
FIG. 14 is a partial, pictorial representation of a counter mechanism incorporated within a rearward portion of the camera of FIG. 1.

Returning to FIG. 19, counter-mechanism 494 is depicted in a position representing the insertion of a fresh cassette 32 within the receiving chamber of camera 10. In this position, the contacts 548 and 550 of switch $S_8$ are shown in electrical connection with commutator 554. As camera 10 is actuated to perform photographic cycles and expend the supply of film units at 34, tip 518 of drive pawl 510, acting in conjunction with drive ratchet 500, incrementally rotates wheel 496 until such time as the supply of film units 34 within cassette 32 is exhausted. As cassette 32 is emptied of its film supply, commutator 554 will have moved in a clockwise direction in the sense of the figures until such time as it has electrically joined common contact 550 with contact 552. The latter combination of contacts represents switch $S_6$ and the orientation of counter-mechanism 494 at this empty status is represented in FIG. 14. With the mechanical orientation there shown, the indicia "E" appears at window 522. Wheel 496 remains in that position through any number of cycles to retain the closed condition of switch $S_6$ until such time as cassette 32 is removed from the receiving chamber of camera 10.

Figure 18:
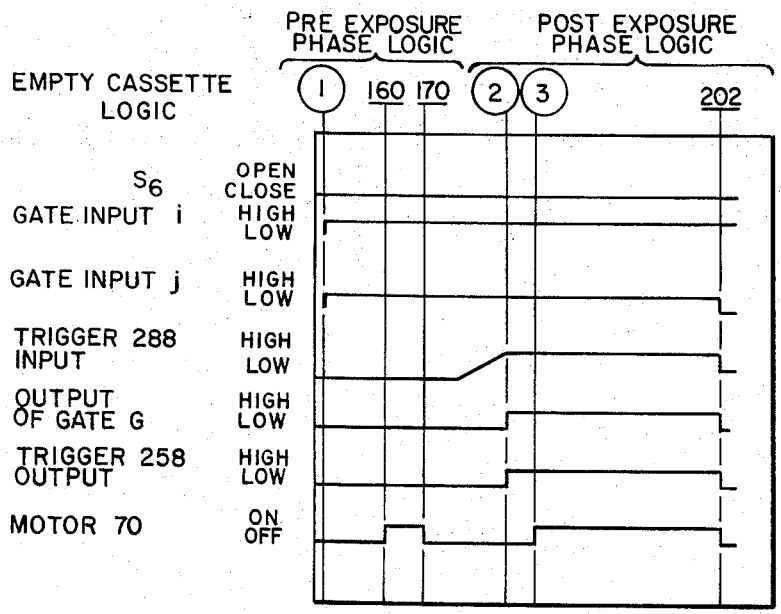
FIG. 18 is an energization status chart for the various components of the circuit of FIG. 6 as they operate in conjunction with an exhausted film supply.

Referring to FIG. 6, 17 and 18, the operation of circuit components carrying out the empty cassette cycle is illustrated in detail. With the closure of switch $S_6$ by counter 494, a signal is imposed from primary power line 240 through line 470 to input terminal $i$ of GATE F. With the manual closure of switch $S_1$ latching network 244 completes the energization of the circuit by assuming its first energization state. The resultant output $t_6$ of OR GATE F assumes a high state as catalogued at Event NO. 1 of FIG. 17. Simultaneously, appropriate input conditions are supplied to GATES A and B, as described in connection with function block 160 of FIG. 4, to forward bias transistor $Q_1$ and energize winding 252 of solenoid 144. Exposure mechanism blades 110 and 112 are driven toward their closed position. During this closure, the high status of output $t_6$ at line 474 is introduced through line 476 to the base of transistor $Q_3$. As in the earlier described override cycle, a high signal imposed from line 476 forward biases the base-emitter junction of transistor $Q_3$. This action isolates the function of switch $S_2$ by drawing line 376 to ground. Accordingly, the flash operation of the control system is automatically de-activated, as described in connection with function block 458 of FIG. 4.

When exposure mechanism blades 110 and 112 reach their terminal positions, switch $S_4$ is closed, thereby altering the output $t_3$ of GATE C from a high to a low state. Motor control 316 energizes motor 70 to release reflex component 50 for movement toward its exposure position. The commencement of energization of motor 70, as well as other select events within FIG. 18, are labeled in correspondence with the numeration of FIG. 4 in the interest of clarity. Those event numbers appearing in FIG. 17 are encircled in FIG. 18.

As reflex component 50 leaves its seated viewing position, ram 80 opens switch $S_5$ to alter output $t_3$ of GATE C to a high state, thereby causing motor control 316 to de-energize motor 70. As reflex component 50 approaches its seated exposure position, ram 80 serves to open switch $S_3$ and activate delay network 330. Following normal time-out of delay network 330, the output of trigger 288 at line 286 converts from a low to a high state to alter the output $t_2$ of GATE B from a low to a high state. Winding 252 of solenoid 144 is de-energized to permit blades 110 and 112 to commence to open under the bias of spring 136.

The high output at line 286 also is inverted at inverter 420 and directed to the base of transistor $Q_4$. A resultant low signal at line 422 serves to remove the forward bias at transistor $Q_4$, thereby removing a shunt about timing capacitor 430, and activating timing network 402.

Following a delay selected to permit blades 110 and 112 to reach their fully open position, trigger 400 of network 402 fires to alter the condition of line 396 from a low to a high state. This high signal is impressed along line 606 to input g of AND GATE G. The resultant output $t_7$ of GATE G at line 608 converts from a low state to a high state as disclosed at Event No. 2 of FIG. 17. This high signal is impressed through diode 610 and line 492 to the input of trigger 258. The resultant output of trigger 258 alters from a low to a high state to cause the control system to enter its post-exposure phase. The reversion to the latter phase has been described in connection with dashed line 604 in FIG. 4.

Post-exposure phase conditions being imposed by trigger 258, the operational events described in conjunction with function blocks 200, 202 and 206 of FIG. 4 are carried out to complete a test cycle.

Since certain changes may be made in the above-described photographic apparatus and system without departing from the scope of the invention herein, it is intended that all matter contained in the description thereof or shown in accompanying drawings shall be interpreted as illustrative and not in a limiting sense.

What is claimed is:

1. A control system for photographic apparatus of a type having components movable between operative positions in a predetermined order to define a photographic cycle, comprising:
   a taking lens;
   means defining a chamber for receiving and securing a cassette having a given supply of photographic material;
   reflex component means for selectively orienting an optical path extending from said taking lens and movable during a pre-exposure phase of said cycle, from a viewing to an exposure position and, during a post-exposure phase of said cycle, from said exposure to said viewing position;
   exposure means for selectively blocking and unblocking said optical path to expose said photographic material;
   control circuit means for regulating the operation of said reflex component means and said exposure means to carry out a said photographic cycle, said control means having an initial state;
   transducer means serving as an electrical-mechanical interface from said control circuit means to said reflex component means and said exposure means, said transducer means being operative to change from an initial pre-photographic cycle condition to track said reflex component means and said exposure means performance throughout a said photographic cycle; and
   reset means actuable in response to select relative movement between said cassette and said chamber for returning said transducer means and said control circuit means, respectively, to said initial condition and said initial state.

2. The control system of claim 1 in which:
   said chamber includes loading access means movable to secure a said cassette therewithin; and
   said reset means includes monitor means having a unique signal condition in response to movement of a said cassette from said chamber, and means having a select signal condition in response to said loading access means movement to secure a cassette, said reset means being responsive to said select signal condition in the presence of said unique signal condition to return said transducer means and said control circuit means, respectively, to said initial states.

3. Photographic apparatus operative to carry out a sequence of operational events in a predetermined order to define a photographic cycle having a pre-exposure phase, an exposure phase and a post-exposure phase comprising:
   exposure mechanism means selectively actuable to block and unblock an optical path,
   reflex operator means movable from a viewing position during said pre-exposure phase to an exposure position orienting said optical path for said exposure phase and subsequently movable during said post-exposure phase to said viewing position;
   exposure control means actuable to control said exposure mechanism means during said exposure phase to define an interval of exposure and having a given output condition while said apparatus is carrying out said post-exposure phase;
   cycle control means for effecting the carrying out of said events defining said pre-exposure phase, for subsequently actuating said exposure control means to establish said exposure phase, and responsive to said given output condition for effecting the carrying out of said post-exposure phase; and
   reset means selectively actuable to effect the carrying out of said operational events defining a said post-exposure phase of a said photographic cycle.

4. The photographic apparatus of claim 3 including:
   means defining a chamber for receiving and securing a container for an assemblage of photographic units; and
   wherein said reset means is actuable in response to a relative movement of a said container with respect to said chamber and the securing of said container therewithin.

5. The photographic apparatus of claim 3 wherein said reset means is selectively actuable to effect said exposure control means given output condition so as to cause the carrying out of said operational events defining a said post-exposure phase of a said photographic cycle.

6. The photographic apparatus of claim 3 wherein:
   said cycle control means includes:
   means for monitoring the presence of photographic units within said apparatus;
   first transducer means having one circuit condition corresponding with a position of said reflex operator means at said viewing position and another circuit condition when located between said viewing position and said exposure position;
   second transducer means operative to convert from one circuit condition to another in correspondence with said reflex operator means being located between said exposure position and a select location proximate thereto, and
   instrumentality means actuable during said post-exposure phase to effect conversion of said first and second transducer means respectively to said one condition.

7. The photographic apparatus of claim 6 in which:
   said cycle control means instrumentality means is actuable in the presence of said exposure control means given output condition to effect said conversion of said first and second transducer means conditions; and said reset means is selectively actuable to effect said given output condition and said instrumentality means actuation so as to provide for the selective carrying out of said operational events defining a said post-exposure phase of a said photographic cycle.

8. The photographic apparatus of claim 3 in which: said cycle control means includes:
means for monitoring the presence of photographic units within said apparatus,
first transducer means having one circuit condition corresponding with the positioning of said reflex operator means at said viewing position and another circuit condition when removed from said viewing position, and
exposure mechanism transducer means having one output condition responsive to said exposure mechanism means blocking said optical path and another output condition corresponding with actuation of said exposure mechanism means to unblock said optical path; and
said reset means includes gate means responsive to a predetermined condition of said monitoring means, to said first transducer means other output condition and to said exposure mechanism transducer means one output condition for effecting said exposure control means given output condition.

9. The photographic apparatus of claim 3 including:
means defining a chamber for receiving and securing a container for an assemblage of photographic units; and
wherein said reset means is actuable in response to the relative movement of a said container within said chamber and the securing of said container therewithin.

10. The photographic apparatus of claim 9 in which:
said cycle control means includes means for monitoring the status of said photographic units; and
said reset means includes switch means responsive to a predetermined condition of said monitoring means for enabling said actuation to effect said exposure control means given output condition.

11. The photographic apparatus of claim 9 in which:
said cycle control means includes counter means having at least one element movable from an initial position, corresponding with the removal of a said container from and subsequent insertion of a container within said receiving chamber, for monitoring a predetermined sequence of said photographic cycles; and
wherein said reset means includes switch means responsive to the position of said element and having a unique circuit condition when said element is in said initial position for enabling said reset means actuation to effect said exposure control means given output condition.

12. The photographic apparatus of claim 3 wherein:
said exposure control means includes means for selectively generating a signal to activate a source of artificial illumination; and
said reset means is operative automatically to suppress said generation when actuated.

13. The photographic apparatus of claim 3 in which said cycle control means includes transducer means having a preliminary condition when said reflex operator means is in said viewing position and actuable to assume a given output condition in response to said movement of said reflex operator means from said viewing toward said exposure position for monitoring said movement and enabling said cycle control means to effect the said carrying out of said events defining said pre-exposure phase.

14. The photographic apparatus of claim 13 including driven instrumentality means actuable by said cycle control means for effecting said reflex operator means movement between said viewing and exposure positions, for actuating said transducer means to assume said given output condition when said reflex operator means is moved during said pre-exposure phase from said viewing position toward said exposure position, and for actuating said transducer means to assume said preliminary condition in correspondence with said reflex operator means movement from said exposure position to said viewing position.

15. The photographic apparatus of claim 14 in which said transducer means comprises:
first switch means actuable from one to another contact condition during said pre-exposure phase when said reflex operator means is moved from said viewing position; and
second switch means actuable from one to another contact condition during said pre-exposure phase when said reflex operator means is proximate said exposure position.

16. The photographic apparatus of claim 15 in which said driven instrumentality means is operative to actuate said first and second switch means respectively into said one contact condition during said post-exposure phase.

17. The photographic apparatus of claim 16 including:
means defining a chamber for receiving and securing a container for an assemblage of photographic units; and
wherein said reset means is actuable in response to relative movement of said container with respect to said chamber and the said securing thereof within said chamber.

18. The photographic apparatus of claim 16 wherein said cycle control means includes a source of electrical energy for energizing said apparatus throughout a said photographic cycle; and
said first switch means is operative to effect deenergization of said apparatus when actuated into said one contact condition during said post-exposure phase.

19. Reflex photographic apparatus, operative to carry out a sequence of operational events defining a photographic cycle comprising:
a housing including means defining an exposure chamber within which an exposure plane is disposed;
a taking lens;
reflex operator means actuable to move between a viewing position, establishing an optical path through said taking lens to a viewing surface, and an exposure position, orienting said optical path to extend through said taking lens to said exposure plane;
exposure mechanism means actuable to block and unblock said optical path;
exposure control means actuable to regulate said exposure mechanism means to define an interval of exposure;

first transducer means for tracking the said movement of said reflex operator means as it is moved into said viewing position and having one output condition corresponding with the presence of said reflex operator means at said viewing position and another output condition when said reflex operator means is without said viewing position;

second transducer means for tracking the said movement of said reflex operator means as it is moved within a locus of travel to and from said exposure position and a position proximate thereto and having one output condition corresponding with said movement within a locus of travel and another reflex operator means being positioned without said output condition corresponding with said locus of travel; and control means for regulating the actuation of said reflex operator means, said exposure means and said exposure control means, to effect the carrying out of said sequence of operational events defining a said photographic cycle, said control means being responsive to said second transducer means one output condition for enabling the actuation of said exposure control means to define a said interval of exposure.

20. The reflex photographic apparatus of claim 19 wherein said control means is responsive to said first transducer means one output condition for effecting the termination of a said photographic cycle.

21. The reflex photographic apparatus of claim 19 in which said control means includes delay means, actuable in response to the commencement of said second transducer means one output condition, for actuating said exposure control means following a predetermined time period selected in correspondence with the time required for said reflex operator means to seat at said exposure position.

22. The reflex photographic apparatus of claim 19 in which said control means includes:

driven instrumentality means actuable during a given said photographic cycle to initially move said reflex operator means from said viewing position into said exposure position, and, thereafter, to return said reflex operator means to said viewing position, said driven instrumentality means having an actuator component movable synchronously and in correspondence with said movement of said reflex operator means between said viewing and exposure positions.

23. The reflex photographic apparatus of claim 22 in which said driven instrumentality means includes a lost motion connection intermediate said actuator component and said reflex operator means.

24. The reflex photographic apparatus of claim 22 in which:

said actuator component is configured and arranged for movement along a given locus of travel in one direction toward one terminal position when said reflex operator means is moved from said viewing position toward said exposure position; and said first and second transducer means are present, respectively, as first and second switch means actuable respectively, to derive said other and one output condition in response to said actuator component moving in said one direction to predetermined positions along said locus of travel.

25. The reflex photographic apparatus of claim 24 in which:

said actuator component is configured and arranged for movement along said given locus of travel in another direction toward an initial terminal position when said reflex operator means is moved from said exposure position toward said viewing position; and said first and second switch means are actuable, respectively, to derive said one and other output condition in response to said actuator component moving in said other direction to predetermined positions along said locus of travel.

26. The reflex photographic apparatus of claim 19 including third transducer means actuable from one condition to another when said optical path is blocked by actuation of said exposure mechanism means; and wherein said control means is responsive to said third transducer means other condition for initially actuating said reflex operator means for movement from said viewing position.

27. Reflex photographic apparatus, operative to carry out a sequence of operational events defining a photographic cycle, comprising:

means defining an exposure chamber within which an exposure plane is disposed;

a taking lens;

reflex operator means actuable to move between a viewing position, establishing an optical path from said taking lens to a viewing surface, and an exposure position orienting said optical path to extend from said taking lens to said exposure plane;

exposure mechanism means actuable to block and unblock said optical path;

exposure control means actuable to regulate said exposure mechanism means to define an interval of exposure;

first transducer means for tracking the said movement of said reflex operator means as it is moved, and having one output condition corresponding with said viewing position and another output condition when said reflex operator means is without said viewing position;

exposure mechanism transducer means actuable from one condition to another when said optical path is blocked by said exposure mechanism means; and control means for regulating the actuation of said reflex operator means, said exposure mechanism means and said exposure control means to effect the carrying out of said sequence of operational events defining a photographic cycle, said control means being responsive to said exposure mechanism transducer means other condition for actuating said reflex operator means to move from said viewing position.

28. The reflex photographic apparatus of claim 27 wherein said control means is responsive to said first transducer means one output condition for effecting the termination of a said photographic cycle.

29. The reflex photographic aparatus of claim 27 wherein said control means is responsive to said exposure mechanism transducer means other condition for actuating said reflex operator means to move from said exposure position to said viewing position to terminate a said photographic cycle.

30. The reflex photographic apparatus of claim 29 wherein said control means is responsive to said first transducer means one output condition for selectively effecting the termination of a said photographic cycle.

31. Photographic apparatus comprising:
cycle control means actuable to regulate said apparatus to carry out operational events in predetermined order to define photographic cycles;
exposure mechanism means having at least one element movable under given dynamic characteristics within a given interval of time from one position to another terminal position unblocking an optical path of said apparatus, and actuable to block said optical path,
monitor means responsive to the status of a supply of photographic material within said apparatus and having a unique signal condition representing the exhaustion of said photographic material supply;
exposure control means responsive to said cycle control means regulation for selectively actuating said exposure mechanism means to define an interval of exposure, and including signal means actuable in synchronism with said exposure mechanism means element movement into said terminal unblocking position and having a predetermined signal condition corresponding with the attainment of said unblocking position; and
empty cycle means actuable in response to said control means regulation, to said monitor means unique signal condition and to said signal means predetermined signal condition for effecting the said actuation of said exposure mechanism means to block said optical path.

32. The photographic apparatus of claim 31 wherein:
said exposure control means includes means for selectively generating a signal to activate a source of artificial illumination; and
said empty cycle means is operative, when activated, to automatically suppress said activating signal.

33. The photographic apparatus of claim 32 in which:
said monitor means includes counter means having at least one element movable in correspondence with a given sequence of said photographic cycles and having a unique orientation representing said exhaustion of said photographic material supply; and
said empty cycle means includes switch means responsive to the position of said element and having a select circuit condition when said element is in said unique orientation.

34. The photographic apparatus of claim 31 wherein:
said exposure control means includes trigger means responsive to a select input signal for effecting the said actuation of said exposure mechanism means element to block said optical path; and
said empty cycle means is operative to insert said select input signal into said trigger means in the presence of said predetermined signal condition.

35. The photographic apparatus of claim 34 in which said empty cycle means includes AND gate means gatable in response to said monitor means unique signal condition and to said signal means predetermined signal condition for inserting said select input signal into said trigger means.

36. The photographic apparatus of claim 35 in which:
said monitor means includes counter means having at least one element movable in correspondence with a given sequence of said photographic cycles and having a unique orientation representing said exhaustion of said photographic material supply; and
said empty cycle means includes switch means responsive to the position of said element and having a select circuit condition establishing said monitor means unique signal condition when said element is in said unique orientation.

37. The photographic apparatus of claim 36 wherein:
said exposure control means includes means for selectively generating a signal to activate a source of artificial illumination; and
said empty cycle means includes suppressing means responsive to said switch means select circuit condition for suppressing said activating signal.

38. A control system for photographic apparatus of a type automatically carrying out a series of operational events defining a photographic cycle in response to the actuation thereof comprising:
exposure means actuable to block and unblock an optical path to define an interval of exposure;
chamber means for supporting a cassette having a given supply of photographic material
monitor means responsive to the status of said photographic material within said cassette and having a unique signal condition representing the exhaustion thereof;
control means responsive to said apparatus actuation and to said monitoring means unique signal condition for effecting the carrying out of a said photographic cycle wherein said exposure means is activated to fully unblock, thence immediately to block said optical path.

39. The control system of claim 38 wherein:
said exposure means includes means for selectively generating a signal to activate a source of artificial illumination; and
said control means is operative, when said apparatus is actuated, to suppress said activating signal.

40. Reflex photographic apparatus, operative to carry out a sequence of operational events defining a photographic cycle, comprising:
means defining an exposure chamber within which an exposure plane is disposed;
a taking lens;
converting means including an actuator component movable toward a terminal position to effect the positioning of a reflex component at a viewing mode location establishing an optical path from said taking lens to a viewing surface, said actuator component being movable away from said terminal position to effect the positioning of said reflex component at an exposure mode location orienting said optical path to extend from said taking lens to said exposure plane;
exposure mechanism means actuable to block and unblock said optical path;
exposure control means actuable to regulate said exposure mechanism means to define an interval of exposure;
first transducer means for tracking the said movement of said reflex component as it is moved into and away from said viewing mode position and having one output condition corresponding with said actuator component movement within a locus of travel between said terminal position and a position closely proximate thereto and having another output condition when said actuator component is without said locus of travel; and cycle control means for regulating the actuation of said converting means, said exposure means and said exposure control means to effect the carrying out of said sequence of operational events defining a photographic cycle, said control means being responsive to said first transducer means one output condition for selectively effecting the termination of a said photographic cycle.

41. The reflex photographic apparatus of claim 40 in which:

said converting means includes motor means initially energizable during a said photographic cycle to cause said actuator component to move away from said terminal position and subsequently energizable to move said actuator component toward said terminal position; and said cycle control means is responsive to said first transducer means other condition for effecting the termination of said motor means initial energization.

42. Reflex photographic apparatus, operative to carry out a sequence of operational events defining a photographic cycle, comprising:

means defining an exposure chamber within which an exposure plane is disposed;

a taking lens;

reflex operator means actuable to move between a veiwing position, establishing an optical path from said taking lens to a viewing surface, and an exposure position orienting said optical path to extend from said taking lens to said exposure plane;

exposure mechanism means actuable to block and unblock said optical path;

exposure control means actuable to regulate said exposure mechanism means to define an interval of exposure;

exposure mechanism transducer means actuable from one condition to another when said optical path is blocked by said exposure mechanism means; and control means for regulating the actuation of said reflex operator means, said exposure means and said exposure control means to effect the carrying out of said sequence of operational events defining a photographic cycle, said control means being responsive to said exposure mechanism transducer means other condition for actuating said reflex operator means to move from said viewing position.

43. Reflex photographic apparatus, operative to carry out a sequence of operational events defining a photographic cycle, comprising:

a housing including means defining an exposure chamber within which an exposure plane is disposed;

a taking lens;

reflex operator means actuable to move between a viewing position, establishing an optical path through said taking lens to a viewing surface, and an exposure position, orienting said optical path to extend through said taking lens to said exposure plane;

exposure mechanism means actuable to block and unblock said optical path;

exposure control means actuable to regulate said exposure mechanism means to define an interval of exposure;

transducer means for tracking the said movement of said reflex operator means as it is moved within a locus of travel to and from said exposure position and a position proximate thereto and having one output condition corresponding with said movement within said locus of travel and another output condition corresponding with said reflex operator means being position without said locus of travel; and control means for regulating the actuation of said reflex operator means, said exposure means and said exposure control means, to effect the carrying out of said sequence of operational events defining a said photographic cycle, said control means being responsive to said transducer means one output condition for enabling the actuation of said exposure control means to define a said interval of exposure.

44. Reflex photographic apparatus, operative to carry out a sequence of operational events defining a photographic cycle, comprising:

a housing including means defining an exposure chamber within which an exposure plane is disposed;

a taking lens;

reflex operator means actuable to move between a viewing position, establishing an optical path through said taking lens to a viewing surface, and an exposure position, orienting said optical path to extend through said taking lens to said exposure plane;

exposure mechanism means actuable to block and unblock said optical path;

exposure control means actuable to regulate said exposure mechanism means to define an interval of exposure;

transducer means for tracking the said movement of said reflex operator means as it is moved within a locus of travel to and from said exposure position and a position proximate thereto and having one output condition corresponding with said movement within said locus of travel and another output condition corresponding with said reflex operator means being positioned without said locus of travel; and control means for regulating the actuation of said reflex operator means, said exposure means and said exposure control means, to effect the carrying out of said sequence of operational events defining a said photographic cycle, said control means including delay means, actuable in response to the commencement of said transducer means one output condition, for actuating said exposure control means following a predetermined time period selected in correspondence with the time required for said reflex operator means to seat at said exposure position.

45. Photographic apparatus comprising:

first means for performing a plurality of steps defining a photographic cycle wherein a record is made of an image of a scene;

second means, including a control circuit having an initial state and responsive to actuating means, for initiating and sequencing the operation of said first means to effect the performance of said plurality of steps in a predetermined manner to accomplish said photographic cycle, said second means being automatically reset to its initial state upon completion of said photographic cycle;

third means for selectively actuating said second means; and fourth means for resetting said second means to its initial state in the event that said second means initiates the operation of said first means but is precluded from effecting the completion of said photographic cycle.

46. The photographic apparatus of claim 45 including means for receiving at least one film unit and said fourth means is automatically responsive to select relative movement between said film unit and said receiving means.

47. The photographic apparatus of claim 45 wherein said second means includes means for detecting the completion of at least one of said steps.

48. The photographic apparatus of claim 45 wherein said second means includes means for detecting the initiation and completion of at least one of said steps.

49. The photographic apparatus of claim 45 wherein such image is recorded on a photosensitive material and one of said steps comprises effecting the treatment of such photosensitive material with a processing fluid after such image has been recorded thereon.

50. The photographic apparatus of claim 49 wherein said first means comprises a pair of fluid spreading members and said one step comprises the advancement of such photosensitive sheet between said pair of fluid spreading members.

51. The photographic apparatus of claim 45 wherein said third means comprises manually operable switch means connected to said second means.

52. The photographic apparatus of claim 45 wherein said photographic cycle comprises pre-image recording operations, image recording operations and post-image recording operations.

53. Photographic apparatus operative from an initial orientation and condition of the components thereof to carry out a sequence of operational events in a predetermined order to define a photographic cycle, comprising:

exposure means operable to selectively block and unblock an optical path, said operation serving to controllably expose a photographic film unit during an exposure phase of said cycle;

processing means actuable to effect the treating of such photographic film unit during a post-exposure phase of said cycle;

cycle control means for effecting the carrying out of said sequence of events to establish said exposure phase and including monitoring means responsive to said exposure means completing said exposure phase for actuating said processing means to carry out said post-exposure phase; and reset means selectively actuable to cause said cycle control means to effect the carrying out of select ones of said operational events to re-establish said initial orientation and condition of said components.

* * * * *